(12) United States Patent
Shimizu

(10) Patent No.: US 9,190,867 B2
(45) Date of Patent: Nov. 17, 2015

(54) SEMICONDUCTOR INTEGRATED CIRCUIT AND OPERATION METHOD OF THE SAME

(71) Applicant: Renesas Electronics Corporation, Kawasaki-shi, Kanagawa (JP)

(72) Inventor: Kazuya Shimizu, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 186 days.

(21) Appl. No.: 14/076,258

(22) Filed: Nov. 10, 2013

(65) Prior Publication Data

US 2014/0145675 A1    May 29, 2014

(30) Foreign Application Priority Data

Nov. 28, 2012   (JP) ................. 2012-259486

(51) Int. Cl.
*H02J 7/02*    (2006.01)
*H01F 38/14*    (2006.01)
*H04B 5/00*    (2006.01)
*H02J 7/00*    (2006.01)

(52) U.S. Cl.
CPC ............... *H02J 7/025* (2013.01); *H01F 38/14* (2013.01); *H04B 5/0025* (2013.01); *H04B 5/0031* (2013.01); *H04B 5/0037* (2013.01); *H04B 5/0075* (2013.01); *H01F 2038/143* (2013.01); *H02J 2007/0096* (2013.01)

(58) Field of Classification Search
CPC ...................................... H02J 7/025
USPC ......................................... 320/108
See application file for complete search history.

(56) References Cited

U.S. PATENT DOCUMENTS

2010/0156355 A1* 6/2010 Bauerle et al. ................ 320/145
2010/0311327 A1   12/2010 Hamada
2011/0156659 A1   6/2011 Saeki et al.

FOREIGN PATENT DOCUMENTS

JP    2009-253649 A    10/2009
JP    2011-155830 A    8/2011

* cited by examiner

*Primary Examiner* — Thuan Do
(74) *Attorney, Agent, or Firm* — Miles & Stockbridge P.C.

(57) ABSTRACT

The present invention is directed to solve a problem that, in the case where NFC and power supply operation of wireless power supply or the like repeat in a time division manner, the count value of a charge timer is reset to an initial value and a charge timer erroneously operates during an NFC period. A charge output terminal charges a battery using DC output voltage. A voltage detecting circuit detects reach of battery voltage to a predetermined level, generates a control signal, and generates a level determination signal discriminating an NFC period and a wireless power supply period by detection of the level of a DC input, voltage of an input terminal. During execution of operation of counting charge time of the battery by the charge timer, the voltage detecting circuit controls the charge timer by the control signal in the NFC period, and the charge timer holds the count value of the counting operation.

20 Claims, 10 Drawing Sheets

FIG. 3

| TERMINAL NAME | TERMINAL FUNCTION | TERMINAL NAME | TERMINAL FUNCTION |
|---|---|---|---|
| INPUT VOLTAGE 1 | POWER SUPPLY INPUT TERMINAL BY WIRELESS POWER TRANSMISSION OR AC POWER SUPPLY INTERFACE | DDOUT1 | DCDC CONVERTER OUTPUT (SWITCHING OUTPUT) |
| INPUT VOLTAGE 2 | POWER SUPPLY INPUT TERMINAL BY USB POWER SUPPLY | DDOUT2 | DCDC CONVERTER OUTPUT (AFTER PASSAGE OF LOW-PASS FILTER) |
| D+ | SUPPLY OF NON-INVERSION INPUT SIGNAL OF USB DIFFERENTIAL DATA | SYS | POWER OUTPUT TO POWER-RECEPTION-SIDE SYSTEM 3 |
| D− | SUPPLY OF INVERSION INPUT SIGNAL OF USB DIFFERENTIAL DATA | BAT | COUPLING TERMINAL OF SECONDARY CELL 26 |
| CLOCK | CLOCK TERMINAL OF EXTERNAL INTERFACE | VDD18 | 1.8 V POWER SUPPLY OUTPUT (SUPPLY TO MCU) |
| SERIAL DATA | SERIAL INPUT/OUTPUT TERMINAL OF EXTERNAL INTERFACE | VDD30 | 3.0 V POWER SUPPLY OUTPUT (SUPPLY TO MCU) |

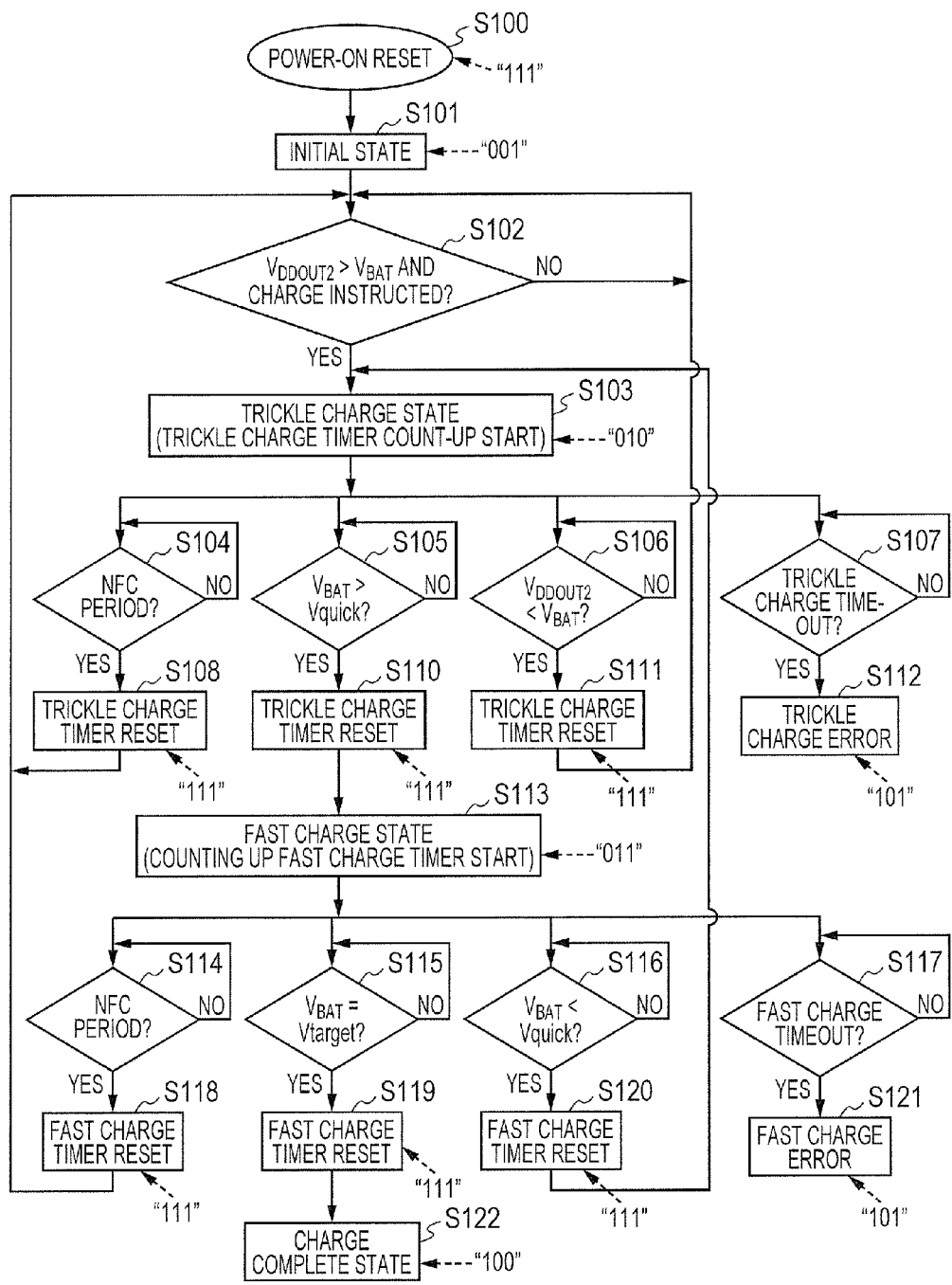

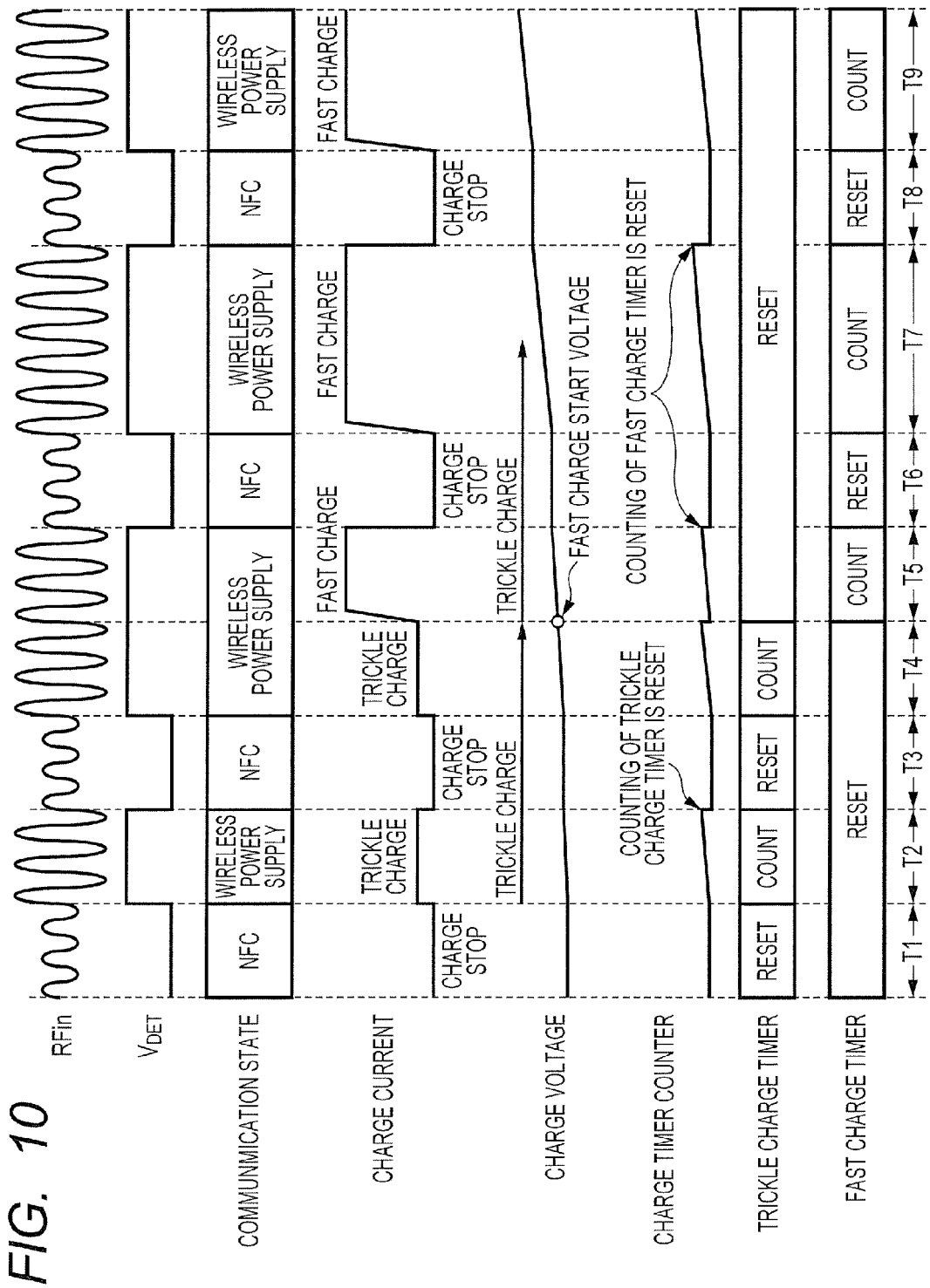

SEMICONDUCTOR INTEGRATED CIRCUIT AND OPERATION METHOD OF THE SAME

CROSS-REFERENCE TO RELATED APPLICATIONS

The disclosure of Japanese Patent Application No. 2012-259486 filed on Nov. 28, 2012 including the specification, drawings and abstract is incorporated herein by reference in its entirety.

BACKGROUND

The present invention relates to a semiconductor integrated circuit and an operation method of the same and, more particularly, to a technique effective to solve a problem such that in the case where NFC and power supplying operation such as wireless power supply repeat in a time division manner, a count value of a charge timer is reset to an initial value during a period of the NFC, and the charge timer operates erroneously.

Conventionally, a semiconductor integrated circuit and an antenna coil are mounted on an IC card, and power supply of the IC card is performed by receiving an RF signal from a reading/writing device called a card reader/card writer by the antenna coil and rectifying it by a rectifier circuit. An IC card having no power supply as described above is spread in an automatic ticket gate system, electronic money, logistics, and the like. The RF power supply is performed to the IC card, and unique identification information (ID information) is stored in a built-in nonvolatile memory, so that the IC card is called an RFID card. An IC card used in the fields of an automatic ticket gate system, electronic money, and the like uses NFC (Near Field Communication) using an RF frequency of 13.56 MHz.

On the other hand, a wireless power supply system called "wireless charger" capable of charging a portable device such as a smartphone which is just put on a dedicated charging table without coupling a power cable to the portable device is being spread. The wireless power supply system is provided to address draining of the battery of a cellular phone called a smartphone. That is, a smartphone is a multifunctional cellular phone having an affinity for the Internet and whose base is the function of a personal computer or a multifunctional cellular phone obtained by adding the PDA function to a telephone and mail function. A wireless power supply system is based on the international standard called "Qi" developed by Wireless Power Consortium (WPC) as an industry organization. By providing each of a transmission-side device and a reception-side device with a coil, power can be supplied from the transmission-side device to the reception-side device by the electromagnetic induction method. The advantages of the wireless power supply system are that it is unnecessary to insert and remove a power connector for charging and, particularly, a work of opening/closing a cover of a power supply connector of a portable device can be omitted.

On the other hand, it is written in FIG. 2 of the following patent literature 1 and disclosure related to it that NFC is performed between a port device and a mobile device and non-contact power transmission for charging a secondary cell (battery) of the mobile device is performed from the port device. The mobile device has an induction coil for NFC and an induction coil for charging, the induction coil for NFC is coupled to an NFC chip, and the induction coil for charging is coupled to a power receiver for charging, a charge controller, and a secondary cell. The port device has an induction coil for NFC and an induction coil for charging, the induction coil for NFC is coupled to an NFC chip, and the induction coil for charging is coupled to a power supply unit for charging.

It is written in FIG. 3 of the patent literature 1 and disclosure related to it that an operation timing of the NFC between a port device and a mobile device and an operation timing of non-contact power transmission for charging a secondary cell (battery) of the mobile device from the port device are repeated in a time division manner. Since the non-contact power transmission for charging is not performed at the operation timing of the NFC by the time division, it is presumed that deterioration in the signal quality such as noise from the non-contact power transmission to the NFC can be lessened.

Further, another non-contact power transmission method is written in FIG. 7 of the patent literature 1 and disclosure related to it that NFC is performed between a port device and a mobile device and a secondary cell (battery) of the mobile device is charged from the port device. The mobile device has one induction coil used for both NFC and charging, the one induction coil is coupled to a circuit selector, and the circuit selector is coupled to an NFC chip and a power receiver for charging. The circuit selector selects arbitrary one of the NFC chip and the power receiver for charging, and the selected one is coupled to the single induction coil via the circuit selector. The port device has one induction coil used for both NFC and charging, the one induction coil is coupled to a circuit selector, and the circuit selector is coupled to an NFC chip and a power supply unit for charging. The circuit selector selects arbitrary one of the NFC chip and the power supply unit for charging, and the selected one is coupled to the single induction coil via the circuit selector.

Further, the following patent literature 2 discloses that in an electronic device for charging a battery by being selectively coupled to power supplies of two or more kinds, a controller is used which performs prompt coupling to another power supply to start charging of the battery when coupling to the power supply from which power is supplied is cancelled. Specifically, the control by the controller is performed in such a manner that the battery is charged by an AC power supply when current is supplied from the AC power supply to an AC coupling unit, and the battery is charged by a power supply of an external device when current is not supplied from the AC power supply to the AC coupling unit but current is supplied from an external device to an external device coupling unit. In particular, when the external device coupling unit is coupled to an external device during the battery is charged by the AC power supply, the controller performs initial communication with the external device and makes a charging setting necessary to charge the battery via the external device. The external device coupling unit is concretely a USB coupling unit, and an interface of another standard such as IEEE1394 can be also employed. In the case where the electronic device is coupled to both the AC power supply and the external device, current from the AC power supply is larger than that from the external device, so that the controller charges the battery by the AC power supply.

BACKGROUND ART LITERATURE

Patent Literature

Patent Literature 1: Japanese Unexamined Patent Publication No. 2009-253649
Patent Literature 2: Japanese Unexamined Patent Publication No. 2011-155830

SUMMARY

Prior to the present invention, the inventors of the present invention were engaged in development of a wireless, that is, non-contact charging method for a secondary cell (battery) to be mounted on a portable communication device such as a smartphone.

In the development, first, the inventors examined portable communication devices and charging methods in the past.

Also in a cellular phone before a smartphone, an antenna coil and an NFC chip for NFC are mounted to realize application functions of an automatic ticket gate system, electronic money, and the like using an IC card performing NFC. Therefore, also in a cellular phone of a smartphone, by following a method of a preceding cellular phone, an antenna coil and an NFC chip for NFC are mounted. However, power of NFC in the related-art technique is a power which makes the antenna coil and the NFC chip operate and does not have a remaining power to charge a secondary cell (battery) mounted on a cellular phone.

On the other hand, the Qi standard developed by WPC as an industry organization uses the frequency of 100 KHz to 200 KHz considerably lower than the RF frequency of 13.56 MHz of the NFC. Therefore, to apply the secondary cell (battery) charging method complied with a wireless power supply system according to the Qi standard to a cellular phone such as a smartphone, an antenna receiving a low frequency of the Qi standard has to be provided for the cellular phone in addition to a related-art antenna coil for NFC. As a result, two kinds of antennas have to be mounted in a cellular phone such as a smartphone, and the problem that it is difficult to assure a mounting space was made clear by the examination performed by the inventors of the present invention prior to the present invention. To solve the problem, in the development performed by the inventors of the present invention prior to the present invention, as described in FIG. 7 of the patent literature 7 and the disclosure related to it, the method of using one induction coil which is used for both NFC and charging in a mobile device is employed.

Further, in the development performed by the inventors of the present invention prior to the present invention, it is required to charge a secondary cell (battery) of a portable electronic device such as a smartphone from a plurality of power supply voltages such as an AC-DC power supply voltage generated by rectifying and smoothing an AC power supply voltage from an AC power supply, a USB power supply voltage from a USB coupling, and a power supply voltage by wireless power supply of the above-described wireless power supply system.

Further, at the time of charging of this battery by a plurality of power supply voltages, a charge monitoring operation is requested. That is, in a secondary cell (battery) such as a lithium ion battery, the maximum charging capacity decreases from the initial value in inverse proportion to increase in the number of charging times, and the maximum charging capacity drops to 50% of the initial value at the maximum number of charging times of about 500 times. Further, when the maximum number of charging times exceeds the number of charging times of 500 times, the value of the maximum charging capacity sharply drops. Therefore, even when a battery which is in an overuse state is charged, there is a case that the voltage does not reach the initial charge voltage, overcurrent flows in a battery or a charger, and it causes a fire. To solve such a problem, in the case where a charge timer is used and the voltage reaches a target charge voltage in predetermined charge time, it is requested to output an alarm.

However, in the case where the NFC and the power supply operation such as wireless power supply repeat in a time division manner, it is impossible to charge a batter by power of the NFC as described above. Consequently, the problem such that the count value of a charge timer is reset to zero as an initial value during the NFC period and the charge timer operates erroneously was made clear by the examination of the inventors of the present invention prior to the present invention.

Charge Timer Examined by Inventors of the Present Invention Prior to Present Invention FIG. 8 is a diagram illustrating the configuration of a charge timer 21242 examined by the inventors of the present invention prior to the present invention.

As illustrated in FIG. 8, the charge timer 21242 examined by the inventors of the present invention prior to the present invention is configured by a charge state machine 212421, a hold signal generating unit 212422, a timer reset signal generating unit 212423, and a charge timer counter 212424. To a first input terminal and a second input terminal of the charge state machine 212421, a state control signal and a communication state signal are supplied, respectively. The state control signal controls the state of the charge state machine 212421 in correspondence with a charge state of the battery from a DC input voltage generated by rectifying and smoothing an RF signal in one induction coil used for both NFC and wireless power supply from a not-illustrated voltage detecting circuit, an output voltage of a not-illustrated step-down DC-DC converter, battery voltage of a secondary cell, and the like. Further, the communication state signal indicates that a present communication is in any of an NFC period and a power supply operation period of wireless power supply or the like repeated in a time division manner. Further, to the second input terminal of the charge state machine 212421 to which a communication state signal is supplied, a power-on reset signal at the operation start time of a battery charger is also supplied.

In response to the state control signal, the communication state signal, and the power-on reset signal, the charge state machine 212421 is set to any of an initial state, a trickle charge state, a quick charge state, a charge error state, and a charge complete state. The initial state is expressed by three bits of, for example, "001" and is a state before the battery charge start. The trickle charge state is expressed by three bits of, for example, "010" and the secondary cell is charged by charge current of the low level before the battery voltage of the secondary cell reaches the quick charge start voltage, thereby making the life of the secondary cell long. The quick charge state is expressed by three bits of, for example, "011" and the secondary cell is charged by charge current of the high level after the battery voltage of the secondary cell reaches quick charge start voltage, thereby shortening the charge time of the secondary cell. The charge error state is expressed by three bits of, for example, "101" to show a trickle charge error and a quick charge error. The trickle charge error is that, although the trickle charge is performed, the battery voltage of the secondary cell does not reach the quick charge start voltage during a predetermined trickle charge period and a timeout signal is generated as a timer output signal of the charge timer counter 212424. The quick charge error is that, although the quick charge is performed, the battery voltage of the secondary cell cannot reach the charge target voltage during a predetermined quick charge period and a timeout signal is generated as a timer output signal of the charge timer counter 212424. The charge completion state is expressed by three bits of, for example, "100" and is a state in which the battery voltage reaches the quick charge start voltage in a predetermined trickle charge period by the trickle charge and, after that, the battery voltage reaches the charge target voltage during a predetermined quick charge period by the quick charge. Although not illustrated in FIG. 8, at the time of the trickle charge or quick charge, the timeout signal generated from the charge timer counter 212424 is supplied to another input terminal of the charge state machine 212421.

In the case where a hold signal "HOLD" of the high level "1" is not supplied from the hold signal generating unit 212422 and, further, a reset signal of the high level "1" is not supplied from the timer reset signal generating unit 212423, the charge timer counter 212424 executes count-up operation as the trickle charge timer or the quick charge timer in response to the clock signal CLK.

In response to generation of a state output signal indicative of the initial state expressed by the three bits "001", the charge complete state expressed by the three bits "100", or the charge error state expressed by the three bits "101" from the charge state machine 212421, the hold signal generating unit 212422 generates the hold signal HOLD of the high level "1". Therefore, in response to the hold signal HOLD of the high level "1" of the hold signal generating unit 212422, the charge timer counter 212424 holds a count-up value at the time point.

In response to supply of a power-on reset signal of operation start of the battery charger or a communication state signal indicating that the present communication state is the NFC period to the second input terminal of the charge state machine 212421, the charge state machine 212421 generates a reset signal generation command. In response to the reset signal generation command of the charge state machine 212421, the timer reset signal generating unit 212423 generates a reset signal of the high level "1". Therefore, in response to the reset signal of the high level "1" of the timer reset signal generating unit 212423, the charge timer counter 212424 is reset to the count value (zero) of the initial value in the initial state expressed by the three bits of "001".

In the base mode of the charge timer 21242 examined by the inventors of the present invention prior to the present invention illustrated in FIG. 8, the time division operation of the NFC and the power supply operation of wireless power supply or the like is not considered in the beginning but only the power supply operation of wireless power supply or the like is considered. After that, the time division operation of the NFC and the power supply operation of wireless power supply or the like is required and, prior to the present invention illustrated in FIG. 8, a communication state signal for indicating that the present communication state is the NFC period is additionally supplied to the second input terminal of the charge timer 21242 examined by the inventors herein.

Charge Monitoring Operation Examined by Inventors Herein Prior to Present Invention FIG. 9 is a flowchart for explaining charge monitoring operation for a secondary cell using the charge timer 21242 illustrated in FIG. 8 and examined by the inventors herein prior to the present invention.

In first step S100 in FIG. 9, in response to the rising of a DC input voltage generated by rectification and smoothing of an RF signal of an induction coil at the operation start time of the battery charger, the state machine 212421 of the charge timer 21242 is set to a power-on reset state expressed by three bits of, for example, "111".

In step S101, the state machine 212421 of the charge timer 21242 automatically shifts from the power-on reset state in step S100 to an initial state expressed by three bits of, for example, "001", that is, a state before the battery charge start.

In step S102, whether an output voltage $V_{DDOUT2}$ of the step-down DC-DC converter is at a level higher than that of the battery voltage $V_{BAT}$ of the secondary cell or not is determined and, further, whether there is a charge instruction to charge the secondary cell from the user of the battery charger or not is determined.

In the case where the two determination results in step S102 are "YES", the state in step S102 shifts to a trickle charge state expressed by three bits of, for example, "010" in step S103. On the other hand, in the case where the two determination results in step S102 are "NO", without executing the trickle charge state in step S103, the routine returns to the input of step S102.

In the trickle charge state in step S103, before the battery voltage of the secondary cell reaches, for example, the quick charge start voltage Vquick of three volts, to make the life of the secondary cell long, the secondary cell is charged with the charge current of the low level. In the trickle charge state in step S103, during a period in which the trickle charge of the secondary cell is executed, the charge timer counter 212424 of the charge timer 21242 illustrated in FIG. 8 executes count-up operation in response to a clock signal CLK as a trickle charge timer.

While the trickle charge of the secondary cell is executed in the trickle charge state in step S103, determining process in step S104, determining process in step S105, determining process in step S106, and determining process in step S107 are executed.

In step S104, from a communication state signal supplied to the second input terminal of the charge state machine 212421, whether the present communication state is the NFC period or not is determined. In the case where the determination result in step S104 is "YES", the state shifts from step S104 to the trickle charge timer reset state expressed by three bits of, for example, "111" in step S108. As a result, in the trickle charge timer reset state in step S108, the count value of the charge timer counter 212424 of the charge timer 21242 illustrated in FIG. 8 is reset to the count value (zero) of the initial value. On the contrary, when the determination result in step S104 is "NO", the routine returns to the input of the step S104.

In the trickle charge timer reset state in step S108, like in the first step S100 in FIG. 9, the state machine 212421 of the charge timer 21242 illustrated in FIG. 8 is set to the reset state. Therefore, after the trickle charge timer reset state in step S108, the routine shifts to the initial state in step S101.

In step S105, whether the battery voltage $V_{BAT}$ of the secondary cell has reached the quick charge start voltage Vquick of, for example, three volts or not is determined. In the case where the determination result of step S105 is "YES", the routine shifts from step S105 to step S110. In the trickle charge timer reset state in step S110, like in the first step S100 in FIG. 9, the state machine 212421 of the charge timer 21242 illustrated in FIG. 8 is set to the reset state. On the contrary, in the case where the determination result of step S105 is "NO", the routine returns to the input of step S105.

In step S106, the determination result and the state in step S102 are changed, and whether the level of the output voltage $V_{DDOUT2}$ of the step-down DC-DC converter is lower than that of the battery voltage $V_{BAT}$ of the secondary cell or not is determined. In the case where the determination result of step S106 is "YES", the routine shifts from step S106 to a trickle charge timer reset state expressed by three bits of, for example, "111" in step S111 and, further, shifts to the initial state in step S101. On the contrary, in the case where the determination result in step S106 is "NO", the routine returns to the input of step S106.

In step S107, it is determined whether or not the battery voltage of the secondary cell does not reach the quick charge start voltage in a predetermined trickle charge period in spite of trickle charge of the secondary cell in the trickle charge state in step S103 and a timeout signal is generated. In the case where a determination result in step S107 is "YES", the routine shifts from step S107 to a charge error state for displaying a trickle charge error expressed by three bits of, for example, "101" in step S112, and the process finished. In the charge error state in step S112, an alarm of the charge error is output by LED display or the like to the user of the battery charger.

In the quick charge state in step S113, the secondary cell in which the battery voltage reaches the quick charge start voltage Vquick in step S105 is charged with high-level charge current, thereby shortening charge time of the secondary cell. In the quick charge state in step S113, in a period of executing quick charge of the secondary cell, the charge timer counter 212424 of the charge timer 21242 illustrated in FIG. 8 executes count-up operation as the quick charge timer in response to the clock signal CLK.

While the quick charge of the secondary cell is executed in the quick charge state in step S113, a determining process in step S114, a determining process in step S115, a determining process in step S116, and a determining process in step S117 are executed.

In step S114, from a communication state signal supplied to the second input terminal of the charge state machine 212421, whether the present communication state is the NFC period or not is determined. In the case where the determination result in step S114 is "YES", the state shifts from step S114 to the quick charge timer reset state expressed by three bits of, for example, "111" in step S118. On the other hand, in the case where the determination result in step S114 is "NO", the routine returns to the input of step S114. As a result, in the quick charge timer reset state in step S118, the charge timer counter 212424 of the charge timer 21242 illustrated in FIG. 8 is reset to the count value (zero) as the initial value.

In the quick charge timer reset state in step S118, the state machine 212421 of the charge timer 21242 illustrated in FIG. 8 is set to the reset state in a manner similar to the first step S100 in FIG. 9. Therefore, after the trickle charge timer reset state in step S108, the routine shifts to the initial state in step S101.

In step S115, whether the battery voltage $V_{BAT}$ of the secondary cell has reached the charge target voltage Vtarget of, for example, 4.2 volts or not is determined. In the case where the determination result of step S115 is "YES", the routine shifts from step S115 to a quick charge timer reset state expressed by three bits of, for example, "111" in step S119. After that, the routine shifts from the quick charge timer reset state in step S119 to a charge complete state expressed by three bits of, for example, "100" in step S122. In the charge complete state in step S122, a charge complete state is output by LED display or the like to the user of the battery charger. On the contrary, in the case where the determination result of step S115 is "NO", the routine returns to the input of step S115.

In step S116, whether or not the determination result and the state in step S105 are changed and the level of the battery voltage $V_{BAT}$ of the secondary cell is lower than that of the quick charge start voltage Vquick of, for example, three volts is determined. In the case where the determination result of step S116 is "YES", the routine shifts from step S116 to a quick charge timer reset state expressed by three bits of, for example, "111" in step S120 and, after that, returns to the trickle charge state in step S103. On the contrary, in the case where the determination result in step S116 is "NO", the routine returns to the input of step S116.

In step S117, it is determined whether or not the battery voltage of the secondary cell does not reach the charge target voltage Vtarget in a predetermined quick charge period in spite of quick charge of the secondary cell in the quick charge state in step S113 and a timeout signal is generated. In the case where a determination result in step S117 is "YES", the routine shifts from step S117 to a charge error state for displaying a quick charge error expressed by three bits of, for example, "101" in step S121, and the process is finished. Also in the charge error state in step S121, an alarm of the charge error is output by LED display or the like to the user of the battery charger.

FIG. 10 is a time chart explaining the charge monitoring operation for the secondary cell using the charge timer 21242 examined by the inventors herein prior to the present invention shown in FIG. 8.

In FIG. 10, a waveform RFin of an RF signal received by one induction coil used for both NFC and charge is illustrated, and the voltage detection signal $V_{DET}$ generated by level detection of a not-illustrated voltage detecting circuit of a DC input voltage generated by rectifying and smoothing the RF signal RFin is also shown.

Further, in FIG. 10, a communication state including the NFC period and the power supply operation period of wireless power supply or the like repeated in a time division manner is illustrated. The period in which the voltage detection signal $V_{DET}$ is at the low level is determined as the NFC period, whereas the period in which the voltage detection signal $V_{DET}$ is at the high level is determined as the power supply operation period of wireless power supply or the like. As a result, as illustrated in FIG. 10, a first period T1, a third period T3, a sixth period T6, and an eighth period T8 in which the voltage detection signal $V_{DET}$ is at the low level are determined as the NFC periods, and a second period T2, a fourth period T4, a fifth period T5, a seventh period T7, and a ninth period T9 in which the voltage detection signal $V_{DET}$ is at the high level are determined as the power supply operation periods of wireless power supply or the like.

In FIG. 10, charge current and charge voltage for charging the secondary cell are illustrated. Before the charge voltage reaches the quick charge start voltage (Vquick), trickle charge is executed. After the charge voltage reaches the quick charge start voltage (Vquick), quick charge is executed. As described above, the power of the NFC is not sufficient to charge the secondary cell (battery). Consequently, in the NFC periods of the first, third, sixth, and eighth periods T1, T3, T6, and T8, the charge current is zero ampere, and a charge stop state is obtained. Also in the NFC periods of the third, sixth, and eighth periods T3, T6, and T8, the trickle charge timer or the quick charge timer is set to the reset state. As a result, the charge timer counter 212424 is reset to the count value (zero) of the initial value in the NFC periods.

As described above, the problem such that in the case where the NFC and the power supply operation such as wireless power supply repeat in a time division manner, the battery cannot be charged by the power of the NFC, so that the count value of the charge timer is reset to zero as the initial value in the NFC period, and the charge timer erroneously operates was made clear by the examination made by the inventors herein prior to the present invention.

Means and the like for solving such a problem will be described hereinafter. The other problems and novel features will become apparent from the description of the specification and the attached drawings.

Outline of a representative embodiment disclosed in the present invention will be briefly described as follows.

A semiconductor integrated circuit (212) as a representative embodiment includes an input terminal (T1), a DC-DC converter (2121) a charge output terminal (T3), a voltage detecting circuit (21241), and a charge timer (21242).

To the input terminal (T1), a DC input voltage ($V_{IN}$) generated by rectifying and smoothing reception signals repetitively supplied as an RF signal by NFC and an RF signal by wireless power supply is supplied.

The DC-DC converter (2121) generates a DC output voltage ($V_{DDOUT2}$) having a desired voltage level from the DC input voltage ($V_{IN}$) supplied to the input terminal (T1).

The charge output terminal (T3) charges an external battery (26) by using the DC output voltage ($V_{DDOU2}$).

The voltage detecting circuit (21241) detects that battery voltage ($V_{BAT}$) of the charge output terminal (T3) reaches a predetermined voltage level (Vquick, Vtarget) by charging the battery (26) and generates a control signal in response to the battery voltage ($V_{BAT}$) and the predetermined voltage level (Vquick, Vtarget).

The charge timer (21242) can count charge time of the battery (26) on the basis of control by the control signal generated from the voltage detecting circuit (21241).

The voltage detecting circuit (21241) generates a level determination signal ($V_{DET}$) discriminating a communication period of the NFC and a power supply period of the wireless power supply by detecting the level of the DC input voltage ($V_{IN}$) supplied to the input terminal (T1).

During execution of operation of counting the charge time of the battery (26) by the charge timer (21242), the voltage detecting circuit (21241) controls the charge timer (21242) by the control signal in the communication period of the NFC so that the charge timer (21242) holds a count value of the counting operation (refer to FIG. 4).

An effect obtained by representative one of the embodiments disclosed in the present invention will be briefly described as follows.

The semiconductor integrated circuit can solve the problem such that in the case where NFC and power supplying operation such as wireless power supply repeat in a time division manner, a count value charge timer is reset to an initial value during a period the NFC, and the charge timer operates erroneously.

BRIEF DESCRIPTION OF THE DRAWINGS

FIG. 3 is a diagram illustrating the functions of external terminals of the semiconductor integrated circuit for battery charging control according to the first embodiment shown in FIG. 2.

FIG. 9 is a flowchart explaining charge monitoring operation for the secondary cell using the charge timer examined by the inventors of the present invention prior to the present invention illustrated in FIG. 8.

FIG. 10 is a time chart explaining charge monitoring operation for the secondary cell using the charge timer examined by the inventors of the present invention prior to the present invention illustrated in FIG. 8.

DETAILED DESCRIPTION

1. Outline of Embodiments

Figure 1:
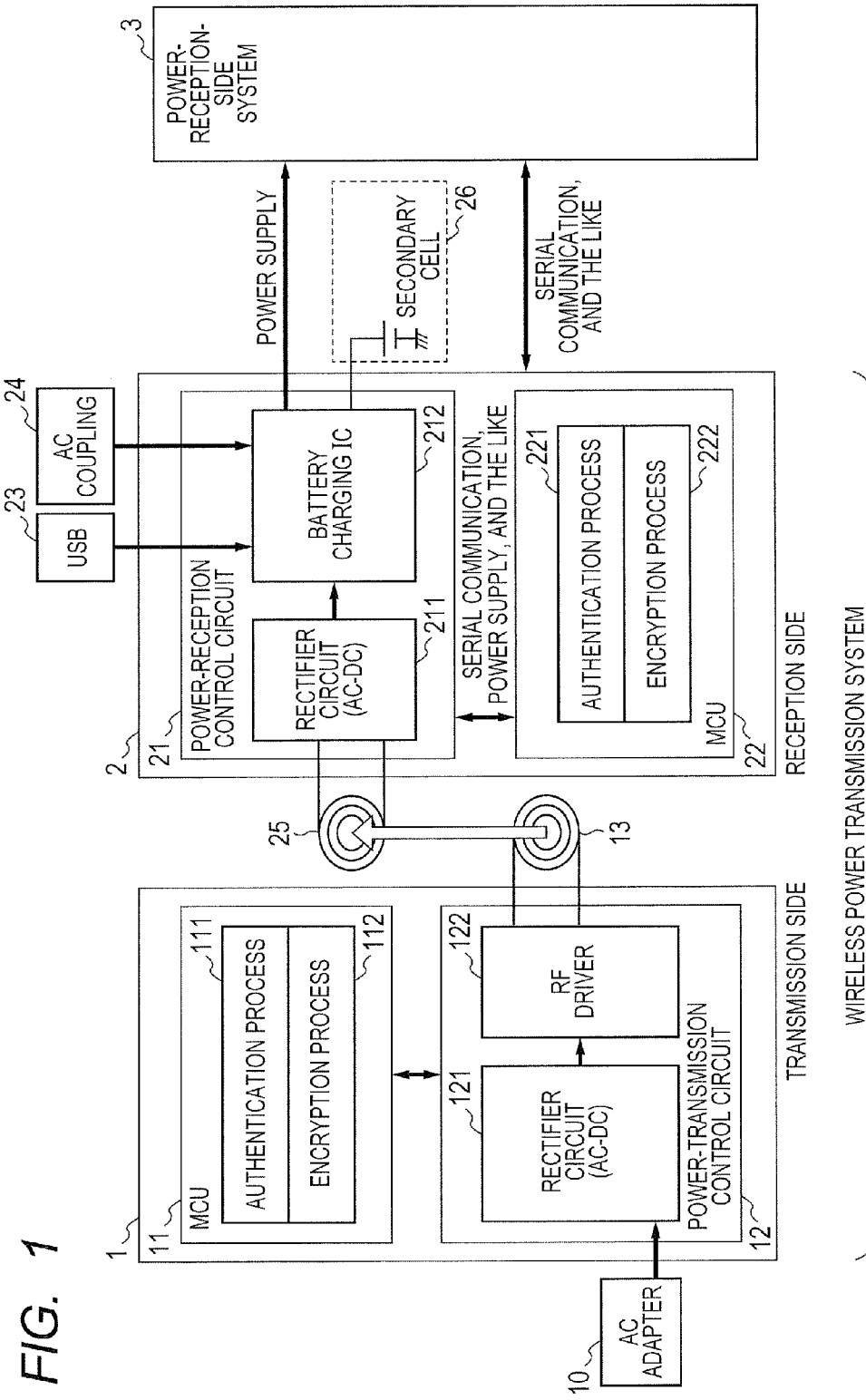
FIG. 1 is a diagram illustrating the configuration of a wireless power transmission system for a multifunctional cellular phone including a semiconductor integrated circuit executing battery charging control operation in a first embodiment.

First, outline of representative embodiments disclosed in the application will be described. Reference numerals in the drawings referred to in parentheses in the description of the outline of the representative embodiments merely illustrate components designated with the reference numerals included in the concept of the components.

[1] A semiconductor integrated circuit (212) as a representative embodiment includes an input terminal (T1), a DC-DC converter (2121), a charge output terminal (T3), a voltage detecting circuit (21241), and a charge timer (21242).

To the input terminal (T1), a DC input voltage ($V_{IN}$) generated by rectifying and smoothing reception signals repetitively supplied as an RF signal by NFC and an RF signal by wireless power supply can be supplied.

The DC-DC converter (2121) can generate a DC output voltage ($V_{DDOUT2}$) having a desired voltage level from the DC input voltage ($V_{IN}$) supplied to the input terminal (T1).

The charge output terminal (T3) can charge an external battery (26) by using the DC output voltage ($V_{DDOU2}$) generated by the DC-DC converter (2121).

The voltage detecting circuit (21241) can detect that battery voltage ($V_{BAT}$) of the charge output terminal (T3) reaches a predetermined voltage level (Vquick, Vtarget) by charging the battery (26) and generate a control signal in response to the battery voltage and the predetermined voltage level.

The charge timer (21242) can count charge time of the battery (26) on the basis of control by the control signal generated from the voltage detecting circuit (21241).

The voltage detecting circuit (21241) can generate a level determination signal ($V_{DET}$) discriminating a communication period of the NFC and a power supply period of the wireless power supply by detecting the level of the DC input voltage ($V_{IN}$) supplied to the input terminal (T1).

Figure 4:
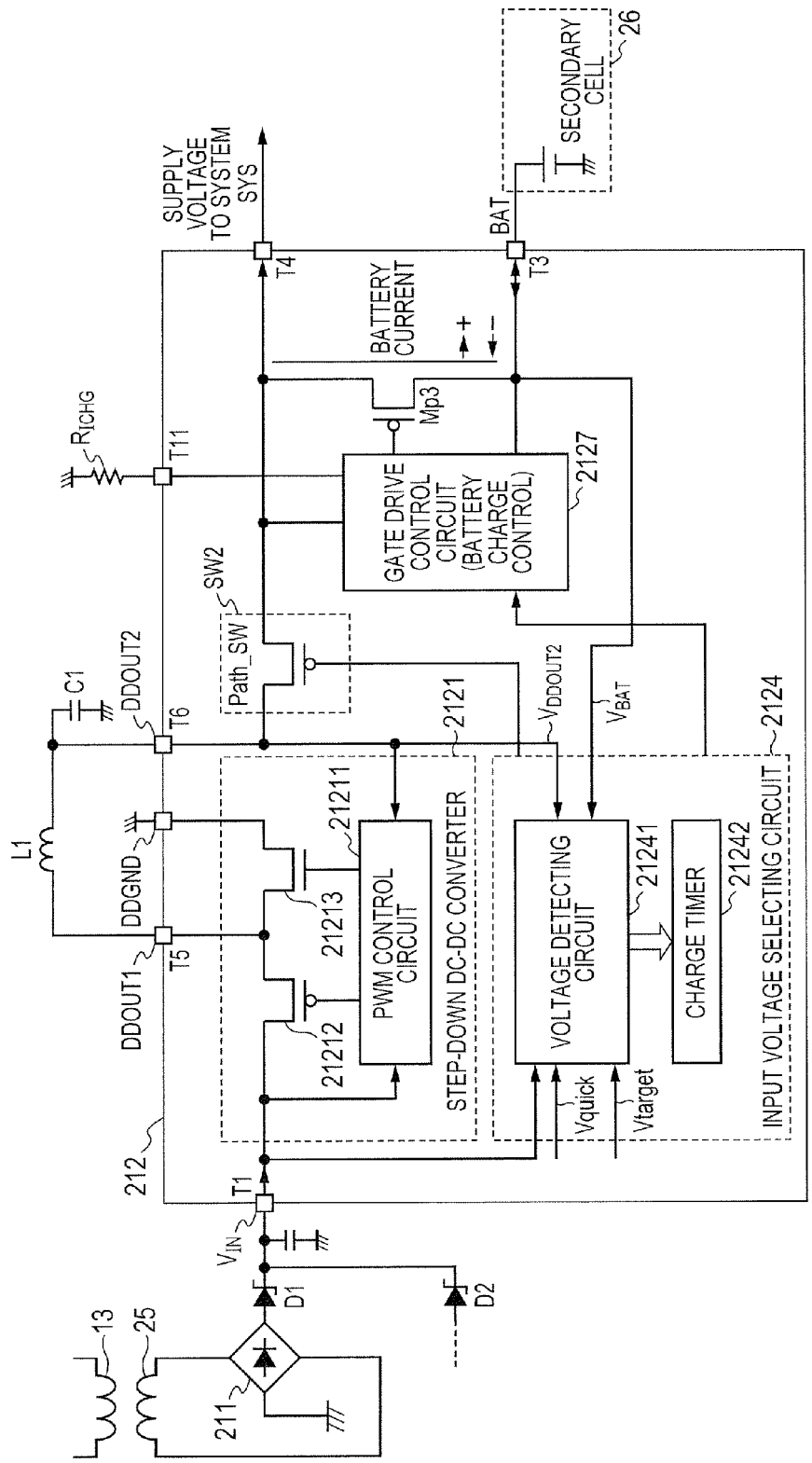
FIG. 4 is a diagram illustrating a basic configuration for power supply to a power-reception-side system and charging of a secondary cell, of the semiconductor integrated circuit for battery charging control according to the first embodiment shown in FIG. 2.

During execution of operation of counting the charge time of the battery (26) by the charge timer (21242), the voltage detecting circuit (21241) controls the charge timer (21242) by the control signal in the communication period of the NFC so that the charge timer (21242) holds a count value of the counting operation (refer to FIG. 4).

According to the embodiment, the problem such that in the case where NFC and power supplying operation such as wireless power supply repeat in a time division manner, a count value of a charge timer is reset to an initial value during a period of the NFC, and the charge timer operates erroneously can be solved.

The semiconductor integrated circuit (212) according to a preferable embodiment further includes a power supply output terminal (T4).

The power supply output terminal (T4) can supply the DC output voltage ($V_{DDOUT2}$) generated by the DC-DC converter (2121) to a power-reception-side system (3) on the outside (refer to FIG. 4).

The semiconductor integrated circuit (212) according to another preferable embodiment further includes a P-channel MOS transistor (Mp3) enabling electric conduction between the power supply output terminal (T4) and the charge output terminal (T3) (refer to FIG. 4).

In further another preferable embodiment, the predetermined voltage level includes a quick charge start voltage (Vquick) and a charge target voltage (Vtarget) as a voltage higher than the quick charge start voltage.

Before the battery voltage ($V_{BAT}$) reaches the quick charge start voltage (Vquick) by the charging of the battery (26), a trickle charge that the battery (26) is charged with low-level trickle charge current is executed.

After the battery voltage ($V_{BAT}$) reaches the quick charge start voltage (Vquick) by execution of the trickle charge on the battery (26), a quick charge of charging the battery (26) with quick charge current having a level higher than that of the trickle charge current is executed (refer to FIG. 4).

In further another preferable embodiment, during operation of executing the trickle charge, the charge timer (21242) can count trickle charge time of the battery (26) on the basis of the control executed by the control signal generated from the voltage detecting circuit (21241).

During execution of operation of counting the trickle charge time of the battery by the charge timer (21242), in the communication period of the NFC, the voltage detecting circuit (21241) controls the charge timer by the control signal, and the charge timer holds the count value of the counting operation (FIG. 4).

In a more preferable embodiment, during operation of executing the quick charge, the charge timer (21242) can count quick charge time of the battery (26) on the basis of the control executed by the control signal generated from the voltage detecting circuit (21241).

During execution of operation of counting the quick charge time of the battery (26) by the charge timer (21242), in the communication period of the NFC, the voltage detecting circuit (21241) controls the charge timer by the control signal, and the charge timer holds the count value of the counting operation (refer to FIG. 4).

In further another embodiment, the charge timer includes a charge state machine (212421), a hold signal generating unit (212422), a charge timer counter (212424), a trickle timer reset signal generating unit (212425), a quick timer reset signal generating unit (212426), a quick charge flag, latch (212427), and a selector (212428).

To the charge state machine (212421), the control signal generated from the voltage detecting circuit (21241), a communication state signal discriminating the communication period of the NFC and the power supply period of the wireless power supply are supplied.

In response to the control signal and the communication state signal, the charge state machine (212421) is set to any of an initial state, a trickle charge state, a quick charge state, a charge error state, a charge complete state, and a charge timer hold state.

The initial state is a state before the battery (26) is charged.

The trickle charge state is a state in which the battery (26) is charged by the trickle charge.

The quick charge state is a state in which the battery (26) is charged by the quick charge.

The charge error state is for displaying a trickle charge error or a quick charge error.

The trickle charge error is that the battery voltage ($V_{BAT}$) of the battery (26) does not reach the quick charge start voltage (Vquick) during a predetermined charge period in spite of the trickle charge.

The quick charge error is that the battery voltage ($V_{BAT}$) of the battery (26) does not reach the charge target voltage (Vtarget) during a predetermined quick charge period in spite of the quick charge.

The charge complete state is a state where the battery voltage ($V_{BAT}$) reaches the quick charge start voltage (Vquick) during the predetermined trickle charge period by the trickle charge and, after that, the battery voltage ($V_{BAT}$) reaches the charge target voltage (Vtarget) during the predetermined quick charge period by the quick charge.

The charge timer hold state is a state where the count value of the charge timer counter (212424) of the charge timer (21242) is held in the NFC period.

In response to an output signal of the charge state machine (212421) which is set in any of the initial state, the charge error state, the charge complete state, and the charge timer hold state, the hold signal generating unit (212422) generates a hold signal and supplies it to a hold terminal of the charge timer counter (212424).

In response to the control signal generated from the voltage detecting circuit (21241) when the battery voltage ($V_{BAT}$) reaches the quick charge start voltage (Vquick) during the predetermined trickle charge period by the trickle charge, the charge state machine (212421) supplies a first signal generation instruction to the trickle timer reset signal generation unit (212425).

In response to the first signal generation instruction supplied from the charge state machine (212421), the trickle timer reset signal generating unit (212425) generates a trickle timer reset signal and supplies it to a first input terminal of the selector (212428).

In response to the control signal generated from the voltage detecting circuit (21241) at the time of start of the quick charge period when the battery voltage ($V_{BAT}$) reaches the quick charge start voltage (Vquick) during the predetermined trickle charge period by the trickle charge, the charge state machine (212421) generates a quick charge flag signal.

The quick charge flag signal is stored in the quick charge flag latch (212427), and an output terminal of the quick charge flag latch (212427) is coupled to a selection control terminal of the selector (212428).

In response to the control signal generated from the voltage detecting circuit (21241) when the battery voltage ($V_{BAT}$) reaches the charge target voltage (Vtarget) during the predetermined charge period by the quick charge, the charge state machine (212421) supplies a second signal generation instruction to the quick timer reset signal generating unit (212426).

In response to the second signal generation instruction supplied from the charge state machine (212421), the quick timer reset signal generating unit (212426) generates a quick timer reset signal and supplies it to a second input terminal of the selector (212428).

In response to the quick charge flag signal supplied from the output terminal of the quick charge flag latch (212427) to the selection control terminal, the selector (212428) selects the quick timer reset signal supplied to the second input terminal and supplies it to a reset terminal of the charge timer counter (212424).

A clock signal (CLK) having a predetermined frequency is supplied to a clock terminal of the charge timer counter (212424).

Figure 5:
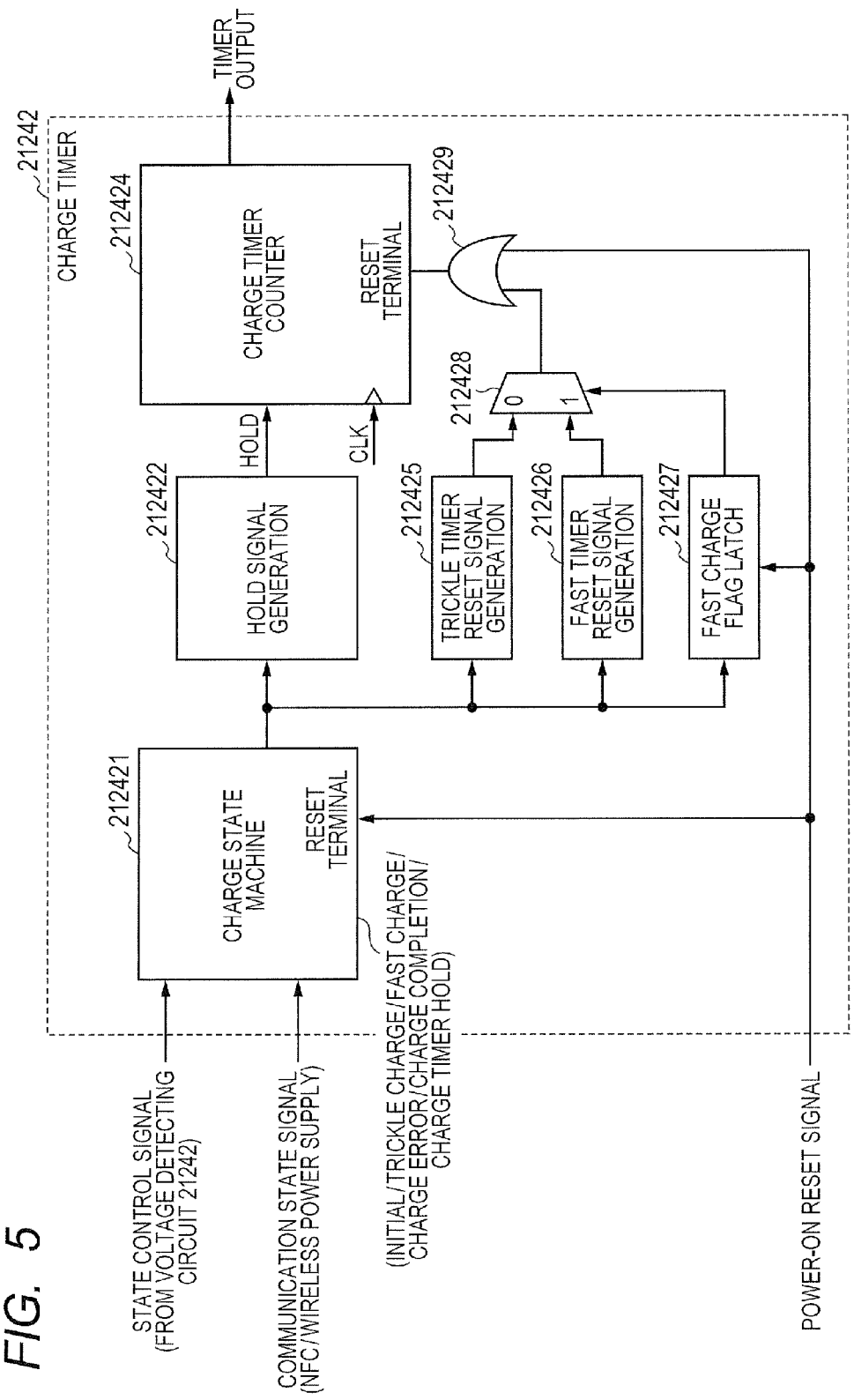
FIG. 5 is a diagram illustrating a configuration of a charge timer of the semiconductor integrated circuit for battery charging control according to the first embodiment shown in FIG. 4.

In the case where the hold signal is not supplied to the hold terminal but the trickle timer reset signal or the quick timer reset signal is not supplied from the selector to the reset terminal, the charge timer counter executes operation of counting up the count value of the counting operation in response to the clock signal (refer to FIG. 5).

In further another preferable embodiment, the charge timer (21242) further includes an OR circuit (212429).

The quick timer reset signal selected by the selector (212428) is supplied to a first input terminal of the OR circuit (212429), a power-on reset signal is supplied to a second input terminal of the OR circuit (212429), and an output terminal of the OR circuit (212429) is coupled to the reset terminal of the charge timer counter (212424) (refer to FIG. 5).

In a concrete embodiment, the semiconductor integrated circuit (212) further includes a linear regulator (2122) coupled in parallel to the DC-DC converter (2121) coupled between the input terminal (T1) and the power supply output terminal (T4).

The linear regulator (2122) operates promptly in response to supply of the DC input voltage ($V_{IN}$) of the input terminal (T1).

Figure 2:
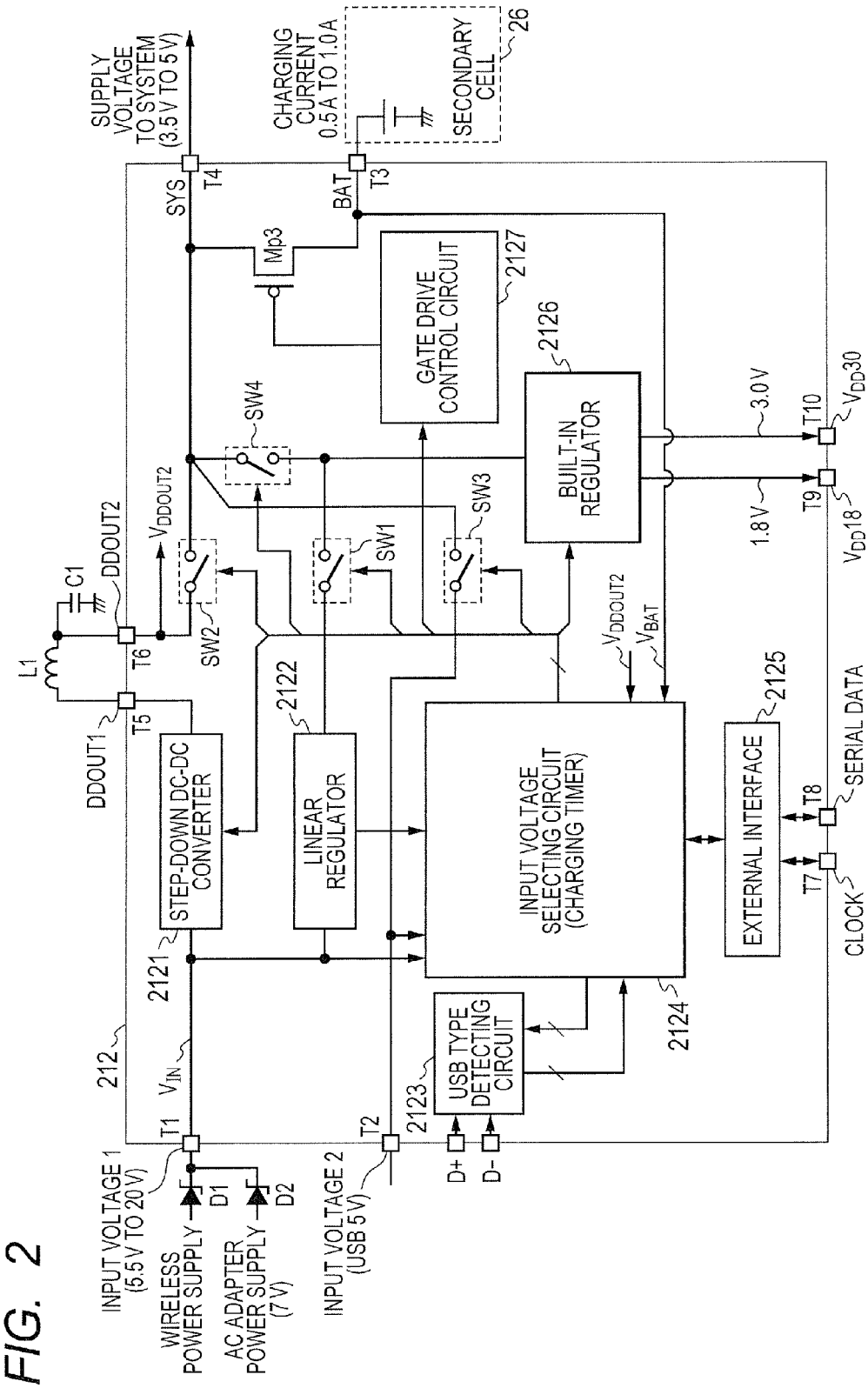
FIG. 2 is a diagram illustrating the configuration of the semiconductor integrated circuit for battery charging control according to the first embodiment shown in FIG. 1.

The DC-DC converter (2121) operates as a switching regulator having power efficiency higher than that of the linear regulator (2122) (refer to FIG. 2).

In another more preferable embodiment, to the input terminal (T1), the DC input voltage ($V_{IN}$) can be supplied via a first schottky diode (D1) and an AC-DC conversion voltage of an Ad power supply coupling interface (24) can be supplied via a second schottky diode (D2) (refer to FIG. 2).

In a most concrete embodiment, the semiconductor integrated circuit (212) further includes another input terminal (T2) and a switch (SW3).

The another input terminal (T2) is configured so that a USB power supply voltage of a USB coupling interface (23) can be supplied to the another input terminal (T2).

One end and the other end of the switch (SW3) are coupled to the another input terminal (T2) and the power supply output terminal (T4), respectively (refer to FIG. 2).

[2] A representative embodiment from another point of view relates to an operation method of a semiconductor integrated circuit (212) having an input terminal (T1), a DC-DC converter (2121), a charge output terminal (T3), a voltage detecting circuit (21241), and a charge timer (21242).

To the input terminal (T1), a DC input voltage ($V_{IN}$) generated by rectifying and smoothing reception signals repetitively supplied as an RF signal by NFC and an RF signal by wireless power supply can be supplied.

The DC-DC converter (2121) can generate a DC output voltage ($V_{DDOUT2}$) having a desired voltage level from the DC input voltage ($V_{IN}$) supplied to the input terminal (T1).

The charge output terminal (T3) can charge an external battery (26) by using the DC output voltage ($V_{DDOU2}$) generated by the DC-DC converter (2121).

The voltage detecting circuit (21241) can detect that battery voltage ($V_{BAT}$) of the charge output terminal (T3) reaches a predetermined voltage level (Vquick, Vtarget) by charging the battery (26) and generate a control signal in response to the battery voltage and the predetermined voltage level.

The charge timer (21242) can count charge time of the battery (26) on the basis of control by the control signal generated from the voltage detecting circuit (21241).

The voltage detecting circuit (21241) can generate a level determination signal ($V_{DET}$) discriminating a communication period of the NFC and a power supply period of the wireless power supply by detecting the level of the DC input voltage ($V_{IN}$) supplied to the input terminal (T1).

During execution of operation of counting the charge time of the battery (26) by the charge timer (21242), the voltage detecting circuit (21241) controls the charge timer (21242) by the control signal in the communication period of the NFC in response to the level determination signal ($V_{DET}$) so that the charge timer (21242) holds a count value of the counting operation (refer to FIG. 4).

According to the embodiment, the problem such that in the case where NFC and power supplying operation such as wireless power supply repeat in a time division manner, a count value of a charge timer is reset to an initial value during a period of the NFC, and the charge timer operates erroneously can be solved.

2. Details of Embodiments

Next, embodiments will be described more specifically. In all of the diagrams for explaining the best mode for carrying out the invention, the same reference numerals are designated to parts having the same functions as those in the above-described drawings, and their description will not be repeated.

First Embodiment

Configuration of Wireless Power Transmission System for Multifunctional Cellular Phone FIG. 1 is a diagram illustrating the configuration of a wireless power transmission system for a multifunctional cellular phone having a semiconductor integrated circuit 212 executing battery charging control operation according to the first embodiment.

The wireless power transmission system for a multifunctional cellular phone illustrated in FIG. 1 is configured by a power transmission circuit 1, a power reception circuit 2, and a power-reception-side system 3. Particularly, in the wireless power transmission system for a multifunctional cellular phone illustrated in FIG. 1, by reception of an RF signal from a power-transmission-side antenna coil 13 by a power-reception-side antenna coil 25, charging of a secondary cell 26 and power supply to the power-reception-side system 3 are executed.

Power Transmission Circuit on Transmission Side

As illustrated in FIG. 1, to the power transmission circuit 1 on the transmission side of the wireless power transmission system, AC power is supplied via an AC adapter 10. The power transmission circuit 1 is configured by a microcontroller unit (MCU) 11 and a power-transmission control circuit 12. The microcontroller unit (MCU) 11 has an authentication processing function 111 and an encryption processing function 112, the power-transmission control circuit 12 includes a rectifier circuit 121 and an RF driver 122, and the RF driver 122 is coupled to the power-transmission-side antenna coil 13.

A DC power supply voltage generated by rectifying and smoothing AC power supplied via the AC adapter 10 by the rectifier circuit 121 is supplied to the microcontroller unit (MCU) 11, the RF driver 122, and the like in the power transmission circuit 1. The authentication processing function 111 and the encryption processing function 112 of the microcontroller unit (MCU) 11 of the power transmission circuit 1 are provided to execute a mutual authentication process for determining whether the user of the multifunctional cellular phone as the power reception circuit 2 is a user having the right of use or not and an encryption process for preventing falsification of communication data, respectively. That is, the microcontroller unit (MCU) 11 of the power transmission circuit 1 executes key management operations related to generation, holding, updating, deleting, and the like of an encryption key related to the communication protocol between the authentication processing function 221 and the encryption processing function 222 of the microcontroller unit (MCU) 22 included in the power reception circuit 2.

As a result, when it is determined by the microcontroller unit (MCU) 11 of the power transmission circuit 1 that the user of the multifunctional cellular phone as the power reception circuit 2 is a user having the right of use, the RF driver 122 generates an RF drive signal supplied to the power-transmission-side antenna coil 13 in response to an RF oscillation output signal generated from a not-illustrated RF oscillator. Further, communication data of the authentication process and the encryption process from the microcontroller unit (MCU) 11 of the power transmission circuit 1 is supplied via the RF driver 122, the power-transmission-side antenna coil 13, and the power-reception-side antenna coil 25 to the power reception circuit 2.

Power Reception Circuit on Reception Side

As illustrated in FIG. 1, the power reception circuit 2 on the reception side of the wireless power transmission system is configured by power-reception control circuit 21 and a microcontroller unit (MCU) 22, the microcontroller unit (MCU) 22 has an authentication processing function 221 and an encryption processing function 222, and the power-reception control circuit 21 includes a rectifier circuit 211 and the semiconductor integrated circuit 212 for battery charging control.

In the wireless power transmission system illustrated in FIG. 1, first, communication according to the above-described communication protocol between the microcontroller unit (MCU) 11 of the power transmission circuit 1 and the microcontroller unit (MCU) 22 of the power reception circuit 2 is executed via the power-transmission-side antenna coil 13 and the power-reception-side antenna coil 25. For the communication, in the power reception circuit 2, serial communication, power supply, and the like can be performed between the power-reception control circuit 21 and the microcontroller unit (MCU) 22. When it is determined by the microcontroller unit (MCU) 11 of the power transmission circuit 1 that the user of the multifunctional cellular phone as the power reception circuit 2 is a user having the right of use, an RF drive signal generated from the RF driver 122 is supplied to the power reception circuit 2 via the power-transmission-side antenna coil 13 and the power-reception-side antenna coil 25.

A DC power supply voltage generated by rectifying and smoothing the RF drive signal by the rectifier circuit 211 and supplied via the power-transmission-side antenna coil 13 and the power-reception-side antenna coil 25 is supplied to the semiconductor integrated circuit 212. The DC power supply voltage supplied from the rectifier circuit 211 to the semiconductor integrated circuit 212 is used for charging the secondary cell 26 and also used for power supply to the power-reception-side system 3.

In the case where the reception side of the wireless power transmission system is a multifunctional cellular phone, the power-reception-side system 3 includes an application processor, a baseband processor, a liquid crystal display driver IC, an RF signal process semiconductor integrated circuit (RFIC), a main memory, a nonvolatile memory such as a flash memory, and the like.

In the case where the reception side of the wireless power transmission system is a portable personal computer such as a tablet PC, the power-reception-side system 3 further includes a central processing unit (CPU) and a flash memory storage of large-scale storage capacity as a replacement for a hard disk.

Further, to the semiconductor integrated circuit 212 for battery charging control and system power supply, not only DC power supply voltage generated by the rectifier circuit 211 but also USB power supply voltage from a USB coupling interface 23 and AC-DC conversion power supply voltage generated by rectification/smoothing of AC power supply voltage from an AC power supply coupling interface 24 can be supplied. Therefore, the semiconductor integrated circuit 212 for battery charging control and system power supply has the function of automatically selecting power supply voltage for battery charging control and system power supply from a plurality of power supply voltages of the DC power supply voltage of the rectifier circuit 211, the USB power supply voltage of the USB coupling interface 23, and the AC-DC conversion power supply voltage of the AC power supply coupling interface 24. USB stands for Universal Serial Bus.

Further, in the wireless power transmission system illustrated in FIG. 1, the power transmission circuit 1 on the power transmission side and the power reception circuit 2 on the power reception side execute wireless power transmission (wireless power supply) for charging the secondary cell 26 and power supply to the power-reception-side system 3 and also execute NFC between the power transmission circuit 1 on the power transmission side as a port device and the power reception circuit 2 on the reception side as a mobile device. Further, by executing the NFC and the wireless power supply in a time division manner, while executing charging of the secondary cell 26 of the power reception circuit 2 on the reception side as a mobile device, the NFC between the power transmission circuit 1 on the power transmission side as a port device and the power reception circuit 2 on the reception side as a mobile device can be executed. By the NFC, the power reception circuit 2 on the reception side as a mobile device can use the wired or wireless Internet environment coupled to the power transmission circuit 1 on the power transmission side as a port device.

Configuration of Semiconductor Integrated Circuit for Battery Charging Control

FIG. 2 is a diagram illustrating the configuration of the semiconductor integrated circuit 212 for battery charging control according to the first embodiment shown in FIG. 1.

As illustrated in FIG. 2, the semiconductor integrated circuit 212 for battery charging control and system power supply includes a step-down DC-DC converter 2121, a linear regulator 2122, a USB type detecting circuit 2123, an input voltage selecting circuit 2124, an external interface 2125, a built-in regulator 2126, and a gate drive control circuit 2127. Further, the semiconductor integrated circuit 212 for battery charging control and system power supply includes a P-channel MOS transistor Mp3 and switches SW1, SW2, SW3, and SW4.

To a supply terminal T1 of a first input voltage 1, a wireless power supply voltage of the power transmission circuit 1 is supplied via a first schottky diode D1, and an AC-DC conversion power supply voltage of the AC power supply coupling interface 24 is supplied via a second schottky diode D2. To a supply terminal T2 of a second input voltage 2, a USB power supply voltage of the USB coupling interface 23 is supplied. The schottky diodes D1 and D2 function as backflow preventing elements between the wireless power supply voltage of the power transmission circuit 1 and the AC-DC conversion power supply voltage of the AC power supply coupling interface 24 and also function as voltage transmission elements for transmitting a power supply voltage as forward voltage lower than that in a PN junction diode. The wireless power supply voltage of the power transmission circuit 1 is a voltage of 5.5 volts to 20 volts, the AC-DC conversion power supply voltage of the AC power supply coupling interface 24 is a voltage of about seven volts, and the USB power supply voltage of the USB coupling interface 23 is a voltage of five volts.

To the step-down DC-DC converter 2121, an inductor L1 and a capacitor C1 are coupled via external terminals DDOUT1 (T5) and DDOUT2 (T6). Therefore, the step-down DC-DC converter 2121 operates as a switching regulator whose starting at the time of power on is slower than that of the linear regulator 2122 but having power efficiency higher than that of the linear regulator 2122. On the other hand, the linear regulator 2122 operates a series regulator which operates promptly after the power on.

That is, the step-down DC-DC converter 2121 and the linear regulator 2122 generate a system supply voltage of about 3.5 volts to 5 volts from the wireless power supply voltage of the power transmission circuit 1 of 5.5 volts to 20 volts or the AC-DC conversion power supply voltage of the AC power supply coupling interface 24 of about seven volts. Therefore, the system supply voltage of five volts from the step-down DC-DC converter 2121 and the linear regulator 2122 is supplied to the power-reception-side circuit 3 via the switches SW2 and SW4 and an external terminal SYS (T4). On the other hand, the USB power supply voltage of the USB coupling interface 23 of five volts is supplied to the power-reception-side system 3 via the switch SW3 and the external terminal SYS (T4).

The USB type detecting circuit 2123 detects the type of the USB coupling interface 23, which is any of USB1.1, USB1.0, USB2.0, and USB3.0, on the basis of the bit rate of differential data signals D+ and D− of the USB coupling interface 23 or the power supply capability of the supply terminal T2 of the second input voltage 2.

The input voltage selecting circuit 2124 executes voltage detection of the supply terminal T1 of the first input voltage 1 and voltage detection of the supply terminal T2 of the second input voltage 2 for selecting the operation mode at the time of starting and, further, executes on/off control of the switches SW1, SW2, SW3, and SW4 and control of the step-down DC-DC converter 2121, the built-in regulator 2126, and the gate drive control circuit 2127. Further, the input voltage selecting circuit 2124 executes control of the USB type detecting circuit 2123 and has the function of supplying USB type detection data obtained by the USB type detecting circuit 2123 to the microcontroller unit (MCU) 22 and the power-reception-side system 3 via the external interface 2125.

Therefore, the external interface 2125 executes bidirectional communication of clocks and serial data between the power-reception-side system 3 and the microcontroller unit (MCU) 22.

To the built-in regulator 2126, the wireless power supply voltage of the power transmission circuit 1 or the AC-DC conversion power supply voltage of the AC power supply coupling interface 24 is supplied via the step-down DC-DC converter 2121 or the linear regulator 2122 or the USB power supply voltage of the USB coupling interface 23 is supplied. As a result, an operation voltage $V_{DD}18$ of 1.8 volts and an operation voltage $V_{DD}30$ of 3.0 volts are generated from the built-in regulator 2126 and supplied to the microcontroller unit (MCU) 22.

The P-channel MOS transistor Mp3 is controlled to the on state by the input voltage selecting circuit 2124 and the gate drive control circuit 2127 to supply the system supply voltage of 3.5 volts to 5 volts of the external terminal SYS (T4) to the secondary cell 26 via an external terminal BAT (T3), thereby executing charging of the secondary cell 26. For example, the secondary cell 26 is a lithium ion cell which is provided in a multifunctional cellular phone or the like and its charging current is a relatively large current of about 0.5 A to 1.0 A.

Further, the gate drive control circuit 2127 generates an output signal for driving the gate of the P-channel MOS transistor Mp3 so that the P-channel MOS transistor MP3 becomes bidirectionally conductive between the external terminal SYS (T4) and the external terminal BAT (T3). Therefore, in the period in which the secondary cell 26 is charged, charging current of the secondary cell 26 is passed from the external terminal SYS (T4) to the external terminal BAT (T3). On the contrary, in the battery operation period by discharging of the secondary cell 26, discharging current is passed from the external terminal BAT (T3) to the external terminal SYS (T4). The gate drive control circuit 2127 also has the function of preventing overcharge and over discharge by executing the current control on the charging current and the discharging current between the charging operation and the discharging operation of the secondary cell 26.

Functions of External Terminals of Semiconductor Integrated Circuit

FIG. 3 is a diagram illustrating the functions of external terminals of the semiconductor integrated circuit 212 for battery charging control according to the first embodiment shown in FIG. 2.

As illustrated in FIG. 3, the external supply terminal of the first input voltage 1 has the function of supplying the wireless power supply voltage of the power transmission circuit 1 or the AC-DC conversion power supply voltage of the AC power supply coupling interface 24 via the first schottky diode D1 or the second schottky diode D2.

Further, the external supply terminal of the second input voltage 2 has the function of supplying the USB power supply voltage of the USB coupling interface 23.

The external supply terminal of the differential data signal D+ has the function of supplying the non-inversion input signal D+ of the differential data of the USB coupling interface 23.

The external supply terminal of the differential data signal D− has the function of supplying the inversion input signal D− of the differential data of the USB coupling interface 23.

An external input/output terminal of a clock has the function of executing bidirectional communication of a clock of the external interface 2125.

An external input/output terminal of serial data has the function of executing bidirectional communication of serial data of the external interface 2125.

The external terminal DDOUT1 has the function of outputting a switching output signal by switching regulator operation in the step-down DC-DC converter 2121.

The external terminal DDOUT2 has the function of outputting output voltage of the step-down DC-DC converter 2121, passed through a low-pass filter configured by the inductor L1 and the capacitor C1.

The external terminal SYS has the function of outputting the power supply voltage to the power-reception-side system 3.

The external terminal BAT has the function of coupling the secondary cell 26.

The external terminal $V_{DD}18$ has the function of outputting the operation voltage $V_{DD}18$ of 1.8 volts to the microcontroller unit (MCU) 22.

The external terminal $V_{DD}30$ has the function of outputting the operation voltage $V_{DD}30$ of 3.0 volts to the microcontroller unit (MCU) 22.

Basic Configuration of Power Supply and Charging

FIG. 4 is a diagram illustrating a basic configuration for power supply to the power-reception-side system 3 and charging of the secondary cell 26, of the semiconductor integrated circuit 212 for battery charging control according to the first embodiment shown in FIG. 2.

As illustrated in FIG. 4, a DC power supply voltage $V_{IN}$ generated when an RF signal from the power-transmission-side antenna coil 13 is received by the reception-side antenna coil 25 and an RF signal of the power-reception-side antenna coil 25 is rectified and smoothed by the rectifier circuit 211 is supplied to the supply terminal T1 of the semiconductor integrated circuit 212 via the schottky diode D1. The step-down DC-DC converter 2121 is coupled to the supply terminal T1, and the step-down DC-DC converter 2121 includes a PWM control circuit 21211, a P-channel MOS transistor 21212 as a high-side switch, and an N-channel MOS transistor 21213 as a low-side switch. The DC power supply voltage $V_{IN}$ is supplied to the source of the P-channel MOS transistor 21212, the drain of the P-channel MOS transistor 21212 and the drain of the N-channel MOS transistor 21213 are coupled to one end of the inductor L1 via the external terminal DDOUT1 (T5), and the source of the N-channel MOS transistor 21213 is coupled to a grounding potential via an external grounding terminal DDGND.

When the PWM control circuit 21211 performs PWM driving to the gate of the P-channel MOS transistor 21212 and the gate of the N-channel MOS transistor 21213, a system supply voltage $V_{DDOUT2}$ generated at a coupling node to which the other end of the inductor L1 and one end of the capacitor C1 are coupled is supplied to a negative feedback terminal of the PWM control circuit 21211 via the external terminal DDOUT2 (T6). The PWM control circuit 21211 PWM controls the ratio between the on period of the P-channel MOS transistor 21212 and the on period of the N-channel MOS transistor 21213 so that the system supply voltage $V_{DDOUT2}$ of the negative feedback terminal becomes a predetermined voltage level.

The system supply voltage $V_{DDOUT2}$ generated at the external terminal DDOUT2 (T6) is supplied from the step-down DC-DC converter 2121 to the source of a P-channel MOS transistor Path_SW in the switch SW2, and the drain of the P-channel MOS transistor Path_SW is coupled to the external terminal SYS (T4), the drain of the P-channel MOS transistor Mp3, and the gate drive control circuit 2127.

The gate of the P-channel MOS transistor Mp3 for supplying the battery charging current to the secondary cell 26 via the external terminal BAT (T3) is coupled to the gate drive control circuit 2127, one end of a resistor $R_{ICHG}$ is coupled to the gate drive control circuit 2127 via the external terminal T11, and the other end of the resistor $R_{ICHG}$ is coupled to the grounding potential. As a result, by adjusting the resistance value of the resistor $R_{ICHG}$, the maximum value of the battery charging current flowing in the source/drain path of the P-channel MOS transistor Mp3 can be adjusted.

The input voltage selecting circuit 2124 in the semiconductor integrated circuit 212 of battery charging control according to the first embodiment illustrated in FIG. 4 includes a voltage detecting circuit 21241 and a charge timer 21242.

To the voltage detecting circuit 21241, the DC power supply voltage $V_{IN}$ of the supply terminal T1, the system supply voltage $V_{DDOUT2}$ of the external terminal DDOUT2 (T6), the battery voltage $V_{BAT}$ of the secondary cell 26 of the external terminal BAT (T3) a quick charge start voltage Vquick of, for example, 3 volts, and a charge target voltage Vtarget of, for example, 4.2 volts are supplied. As a result, the voltage detecting circuit 21241 generates a level detection signal $V_{DET}$ determining an NFC period and a power supply operation period of wireless power supply or the like by detecting the level of the DC power supply voltage $V_{IN}$ of the supply terminal T1 That is, a period where the level voltage detection signal $V_{DET}$ is at the low level is determined as the NFC period. A period where the voltage detection signal $V_{DET}$ is at the high level is determined as the power supply operation period of wireless power supply or the like.

Further, in response to the system supply voltage $V_{DDOUT2}$ of the external terminal DDOUT2 (T6), the battery voltage $V_{BAT}$ of the secondary cell 26 of the external terminal BAT (T3), the quick charge start voltage Vquick, and the charge target voltage Vtarget, the voltage detecting circuit 21241 generates a state control signal which controls the charge timer 21242.

Charge Timer

FIG. 5 is a diagram illustrating the configuration of the charge timer 21242 of the semiconductor integrated circuit 212 for battery charging control according to the first embodiment shown in FIG. 4.

The charge timer 21242 according to the first embodiment illustrated in FIG. 5 includes a charge state machine 212421, a hold signal generating unit 212422, a charge timer counter 212424, a trickle timer reset signal generation unit 212425, a quick timer reset signal generation unit 212426, a quick charge flag latch 212427, a selector 212428, and an OR circuit 212429.

To the first input terminal of the charge state machine 212421 in FIG. 5, a state control signal generated from the voltage detecting circuit 21241 in the input voltage selecting circuit 2124 of the semiconductor integrated circuit 212 for battery charging control according to the first embodiment illustrated in FIG. 4 is supplied. Further, to the second input terminal of the charge state machine 212421 in FIG. 5, a communication state signal generated from the voltage detecting circuit 21241 in the input voltage selecting circuit 2124 of the semiconductor integrated circuit 212 for battery charging control according to the first embodiment illustrated in FIG. 4 is supplied. Further, to the reset terminal of the charge state machine 212421 in FIG. 5, a power-on reset signal generated at the start time of operation of the battery charger is supplied from the voltage detecting circuit 21241 of the input voltage selecting circuit 2124 of the semiconductor integrated circuit 212 for battery charging control according to the first embodiment illustrated in FIG. 4 is also supplied. Further, the power-on reset signal is supplied to the quick charge flag latch 212427 and the OR circuit 212429. Although not illustrated in FIG. 5, the power-on reset signal is supplied also to the hold signal generating unit 212422, the charge timer counter 212424, the trickle timer reset signal generating unit 212425, and the quick timer reset signal generating circuit 212426.

In response to the state control signal, the communication state signal, and the power-on reset signal, the charge state machine 212421 is set to any one of an initial state, a trickle charge state, a quick charge state, a charge error state, a charge completion state, and a charge timer hold state.

The initial state is expressed by three bits of, for example, "001" and is a state before the battery charge start. The trickle charge state is expressed by three bits of, for example, "010" and the secondary cell is charged by charge current of the low level before the battery voltage of the secondary cell reaches the quick charge start voltage, thereby making the life of the secondary cell long. The quick charge state is expressed by three bits of, for example, "011" and the secondary cell is charged by charge current of the high level after the battery voltage of the secondary cell reaches quick charge start voltage, thereby shortening the charge time of the secondary cell. The charge error state is expressed by three bits of, for example, "101" to show a trickle charge error and a quick charge error. The trickle charge error is that, although the trickle charge is performed, the battery voltage of the secondary cell does not reach the quick charge start voltage during a predetermined trickle charge period and a timeout signal is generated as a timer output signal of the charge timer counter 212424. The quick charge error is that, although the quick charge is performed, the battery voltage of the secondary cell does not reach the charge target voltage during a predetermined quick charge period and a timeout signal is generated as a timer output signal of the charge timer counter 212424. The charge completion state is expressed by three bits of, for example, "100" and is a state in which the battery voltage reaches the quick charge start voltage in a predetermined trickle charge period by the trickle charge and, after that, the battery voltage reaches the charge target voltage during a predetermined quick charge period by the quick charge. The charge timer hold state is a state particularly added in the first embodiment, is expressed by three bits of, for example, "110" and the count value of the charge timer counter 212424 of the charge timer 21242 according to the first embodiment illustrated in FIG. 5 is held during the NFC period. Although not illustrated in FIG. 5, the timeout signal generated from the charge timer counter 212424 at the time of trickle charge or quick charge is supplied to the other input terminal of the charge state machine 212421.

A clock signal CLK having a predetermined frequency is supplied to the clock terminal of the charge timer counter 212424. In the case where a hold signal "HOLD" of the high level "1" is not supplied from the hold signal generating unit 212422 and, further, a reset signal of the high level "1" is not supplied from the OR circuit 212429, the charge timer counter 212424 of FIG. 5 executes count-up operation as the trickle charge timer or the quick charge timer in response to the clock signal CLK.

In response to a state output signal indicative of the initial state of the three bits "001", the charge completion state of the three bits "100", the charge error state of the three bits "101" or the charge timer hold state of the three bits "110" generated from the charge state machine 212421, the hold signal generating unit 212422 generates the hold signal HOLD of the high level "1". Therefore, in response to the hold signal HOLD of the high level "1" of the hold signal generating unit 212422, the charge timer counter 212424 holds a count-up value at the time point.

In response to the fact that the battery voltage $V_{BAT}$ of the secondary cell 26 reaches the quick charge start voltage Vquick during a predetermined trickle charge period by trickle charge, the charge state machine 212421 generates a trickle charge reset signal generation command. In response to a trickle charge reset signal generation command from the charge state machine 212421, the trickle timer reset signal generating unit 212425 generates a reset signal of the high level "1" and supplies it to the first input terminal of the selector 212428.

During the trickle charge period, a flag signal of the low level "0" indicating that the period is the trickle charge period, not the quick charge period, at this time point is supplied from the charge state machine 212421 to the quick charge flag latch 212427. Therefore, since a flag signal of the low level "0" is supplied from the output terminal of the quick charge flag latch 212427 to a selection control terminal of the selector 212428, the selector 212428 supplies a reset signal of the high level "1" of the trickle timer reset signal generating unit 212425 supplied to the first input terminal to the reset terminal of the charge timer counter 212424 via the OR circuit 212429. As a result, the count value of the charge timer counter 212424 as a trickle timer is reset to the initial value (zero).

Since the quick charge period starts when the battery voltage $V_{BAT}$ of the secondary cell 26 reaches the quick charge start voltage Vquick in the trickle charge period, a flag signal of the high level "1" indicating that the period is the quick charge period, not the trickle charge period, at this time point is supplied from the charge state machine 212421 to the quick charge flag latch 212427. Therefore, a flag signal of the high level "1" is supplied from the output terminal of the quick charge flag latch 212427 to the selection control terminal of the selector 212428, so that the selector 212428 supplies an output signal of the quick timer reset signal generating unit 212426 supplied to the second input terminal to the reset terminal of the charge timer counter 212424 via the OR circuit 212429.

In response to the fact that the battery voltage $V_{BAT}$ of the secondary cell 26 reaches the charge target voltage Vtarget during a predetermined quick charge period by quick charge, the charge state machine 212421 generates a quick charge reset signal generation command. As a result, in response to a quick charge reset signal generation command from the charge state machine 212421, the quick timer reset signal generating unit 212426 generates a reset signal of the high level "1" and supplies it to the second input terminal of the selector 212428.

Consequently, in the quick charge period, the flag signal of the high level "1" indicating that the period is the quick charge period, not the trickle charge period, at this time point is supplied from the charge state machine 212421 to the quick charge flag latch 212427. Therefore, the flag signal of the high level "1" is supplied from the output terminal of the quick charge flag latch 212427 to the selection control terminal of the selector 212428, and the selector 212428 supplies the reset signal of the high level "1" of the quick timer reset signal generating unit 212426 supplied to the second input terminal to the reset terminal of the charge timer counter 212424 via the OR circuit 212429. As a result, the count value of the charge timer counter 212424 as a quick timer is reset to the initial value (zero).

Flowchart of Charge Monitoring Operation in First Embodiment

Figure 6:
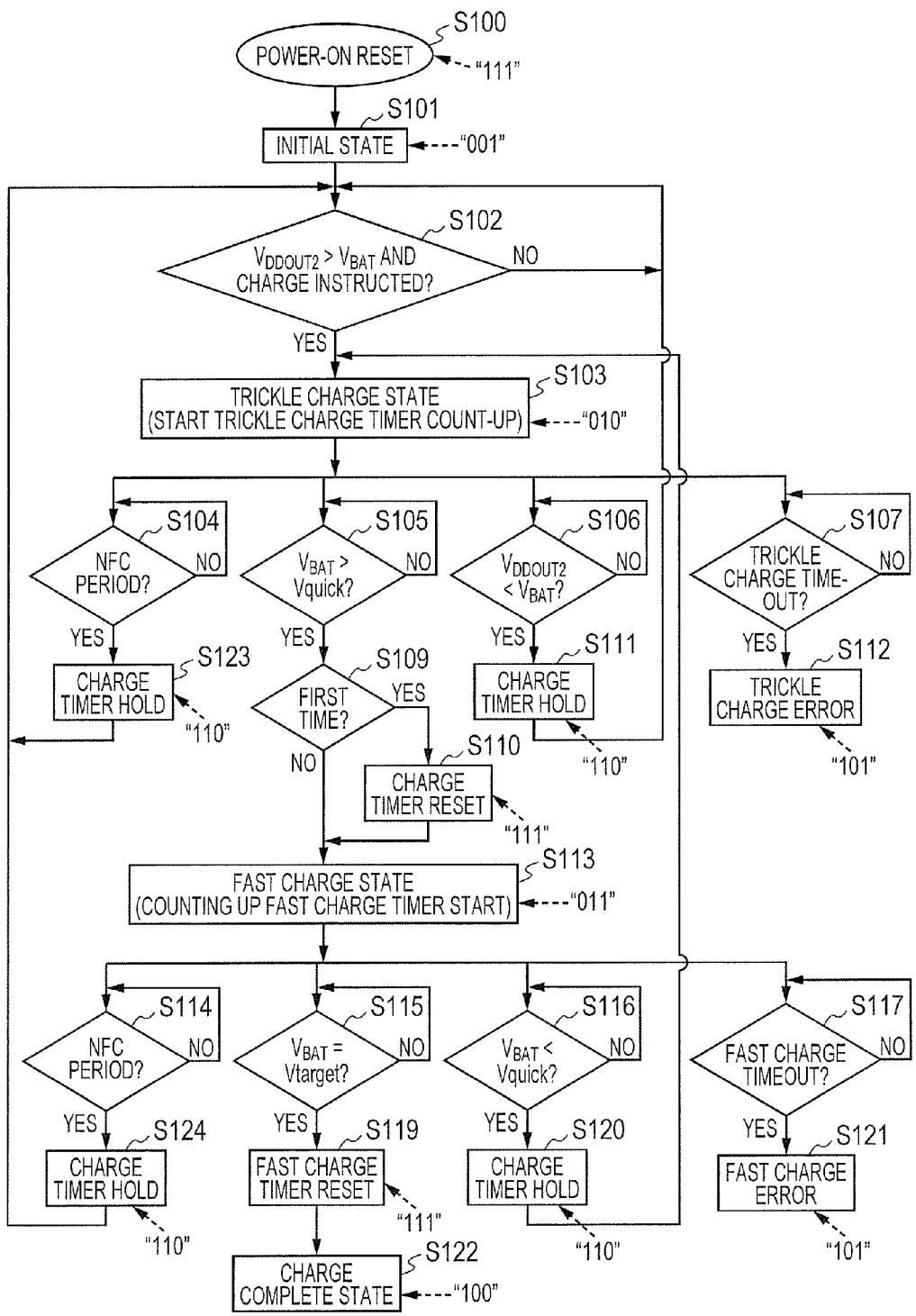
FIG. 6 is a flowchart explaining charge monitoring operation for a secondary cell using the charge timer of the semiconductor integrated circuit for battery charging control according to the first embodiment shown in FIGS. 4 and 5.

FIG. 6 is a flowchart explaining charge monitoring operation for a secondary cell using the charge timer 21242 of the semiconductor integrated circuit 212 for battery charging control according to the first embodiment shown in FIGS. 4 and 5.

In first step S100 in FIG. 6, in response to the rising of a DC input voltage generated by rectification and smoothing of an RF signal of the reception-side antenna coil 25 as an induction coil at the operation start time of the battery charger, the state machine 212421 of the charge timer 21242 is set to a power-on reset state expressed by three bits of, for example, "111".

In step S101, the state machine 212421 of the charge timer 21242 automatically shifts from the power-on reset state in step S100 to an initial state expressed by three bits of, for example, "001", that is, a state before the battery charge start.

In step S102, whether an output voltage $V_{DDOUT2}$ of the step-down DC-DC converter is at a level higher than that of the battery voltage $V_{BAT}$ of the secondary cell or not is determined and, further, whether there is a charge instruction to charge the secondary cell from the user of the battery charger or not is determined.

In the case where the two determination results in step S102 are "YES", the state in step S102 shifts to a trickle charge state expressed by three bits of, for example, "010" in step S103. On the other hand, in the case where the two determination results in step S102 are "NO", without executing the trickle charge state in step S103, the routine returns to the input in step S102.

In the trickle charge state in step S103, before the battery voltage of the secondary cell reaches, for example, the quick charge start voltage Vquick of three volts, to make the life of the secondary cell long, the secondary cell is charged with the charge current of the low level. In the trickle charge state in step S103, during a period in which the trickle charge of the secondary cell is executed, the charge timer counter 212424 of the charge timer 21242 illustrated in FIG. 5 executes count-up operation in response to a clock signal CLK as a trickle charge timer.

While the trickle charge of the secondary cell is executed in the trickle charge state in step S103, determining process in step S104, determining process in step S105, determining process in step S106, and determining process in step S107 are executed.

In step S104, from a communication state signal supplied to the second input terminal of the charge state machine 212421, whether the present communication state is the NFC period or not is determined. In the case where the determination result in step S104 is "YES", the state shifts from step S104 to the charge timer hold state expressed by three bits of, for example, "110" in step S123. As a result, in the charge timer hold state in step S123, the count value of the charge timer counter 212424 of the charge timer 21242 illustrated in FIG. 5 is held at the value at that time point without being reset to the count value (zero) of the initial value. Further, when the process of holding the count value of the charge timer counter 212424 in the charge timer hold state in step S123 is finished, the routine returns to the output of the initial state of step S101. On the contrary, when the determination result in step S104 is "NO", the routine returns to the input of the step S104.

Therefore, in the flowchart of the charge monitoring operation for the secondary cell according to the first embodiment illustrated in FIG. 6, the problem such that the count value of the charge timer is reset to zero as the initial value in the NFC period during the trickle charging operation in the trickle charge state in step S103 and the charge timer operates erroneously can be solved.

In step S105, whether the battery voltage $V_{BAT}$ of the secondary cell has reached the quick charge start voltage Vquick of, for example, three volts or not is determined. In the case where the determination result of step S105 is "YES", the routine shifts from step S105 to determining process in step S109. On the contrary, in the case where the determination result of step S105 is "NO", the routine returns to the input of step S105.

In step S106, the determination result and the state in step S102 are changed, and whether the level of the output voltage $V_{DDOUT2}$ of the step-down DC-DC converter is lower than that of the battery voltage $V_{BAT}$ of the secondary cell or not is determined. In the case where the determination result of step S106 is "YES", the routine shifts from step S106 to a charge timer hold state expressed by three bits of, for example, "110" in step S111 and, further, shifts to the initial state in step S101. On the contrary, in the case where the determination result in step S106 is "NO", the routine returns to the input of step S106.

In step S107, it is determined whether or not the battery voltage of the secondary cell does not reach the quick charge start voltage in a predetermined trickle charge period in spite of trickle charge of the secondary cell in the trickle charge state in step S103 and a timeout signal is generated. In the case where a determination result in step S107 is "YES", the routine shifts from step S107 to a charge error state for displaying a trickle charge error expressed by three bits of, for example, "101" in step S112, and the process is finished. In the charge error state in step S112, an alarm of the charge error is output by LED display or the like to the user of the battery charger.

In the determining process in step S109 shifted from step S105, whether reach from the battery voltage $V_{BAT}$ of the secondary cell in step S105 to the quick charge start voltage Vquick is the first reach or not is determined. In the case where the determination result in step S109 is "YES", the routine shifts from step S109 to a trickle charge timer reset state expressed by three bits of, for example, "111" in step S110 and, after that, shifts to a quick charge state in step S113. On the other hand, in the case where the determination result in step S109 is "NO", the routine shifts from step S109 directly to the quick charge state expressed by three bits of, for example, "011" in step S113. That is, in the case where reach from the battery voltage $V_{BAT}$ of the secondary cell in step S105 to the quick charge start voltage Vquick is the second or more, the trickle charge timer reset in step S110 is omitted. The charge timer is not reset every voltage reach, and charge time can be managed normally, so that stability of the battery charger can be improved.

In the quick charge state in step S113, the secondary cell in which the battery voltage reaches the quick charge start voltage Vquick in step S105 is charged with high-level charge current, thereby shortening charge time of the secondary cell. In the quick charge state in step S113, in a period of executing quick charge of the secondary cell, the charge timer counter 212424 of the charge timer 21242 illustrated in FIG. 5 executes count-up operation as the quick charge timer in response to the clock signal CLK.

While the quick charge of the secondary cell is executed in the quick charge state in step S113, a determining process in step S114, a determining process in step S115, a determining process in step S116, and a determining process in step S117 are executed.

In step S114, from a communication state signal supplied to the second input terminal of the charge state machine 212421, whether the present communication state is the NFC period or not is determined. In the case where the determination result in step S114 is "YES", the state shifts from step S114 to the charge timer hold state expressed by three bits of, for example, "110" in step S124. As a result, in the charge timer hold state in step S124, the count value of the charge timer counter 212424 of the charge timer 21242 illustrated in FIG. 5 is held at the value at that time point without being reset to the count value (zero) of the initial value. Further, when the process of holding the count value of the charge timer counter 212424 in the charge timer hold state in step S124 is finished, the routine returns to the output of the initial state of step S101. On the contrary, when the determination result in step S114 is "NO", the routine returns to the input of the step S114.

Therefore, in the flowchart of the charge monitoring operation for the secondary cell according to the first embodiment illustrated in FIG. 6, the problem such that the count value of the charge timer is reset to zero as the initial value in the NFC period during the quick charging operation in the quick charge state in step S113 and the charge timer operates erroneously can be solved.

In step S115, whether the battery voltage $V_{BAT}$ of the secondary cell has reached the charge target voltage Vtarget of, for example, 4.2 volts or not is determined. In the case where the determination result of step S115 is "YES", the routine shifts from step S115 to a quick charge timer reset state expressed by three bits of, for example, "111" in step S119. After that, the routine shifts from the quick charge timer reset state in step S119 to a charge complete state expressed by three bits of, for example, "100" in step S122. In the charge complete state in step S122, a charge complete state is output by LED display or the like to the user of the battery charger. On the contrary, in the case where the determination result of step S115 is "NO", the routine returns to the input of step S115.

In step S116, whether or not the determination result and the state in step S105 are changed and the level of the battery voltage $V_{BAT}$ of the secondary cell is lower than that of the quick charge start voltage Vquick of, for example, three volts is determined. In the case where the determination result of step S116 is "YES", the routine shifts from step S116 to a charge timer hold state expressed by three bits of, for example, "110" in step S120 and, after that, returns to the trickle charge state in step S103. On the contrary, in the case where the determination result in step S116 is "NO", the routine returns to the input of step S116.

In step S117, it is determined whether or not the battery voltage of the secondary cell does not reach the charge target voltage Vtarget in a predetermined quick charge period in spite of quick charge of the secondary cell in the quick charge state in step S113 and a timeout signal is generated. In the case where a determination result in step S117 is "YES", the routine shifts from step S117 to a charge error state for displaying a quick charge error expressed by three bits of, for example, "101" in step S121, and the process is finished. In the charge error state in step S121, an alarm of the charge error is output by LED display or the like to the user of the battery charger.

Time Chart of Charge Monitoring Operation in First Embodiment

Figure 7:
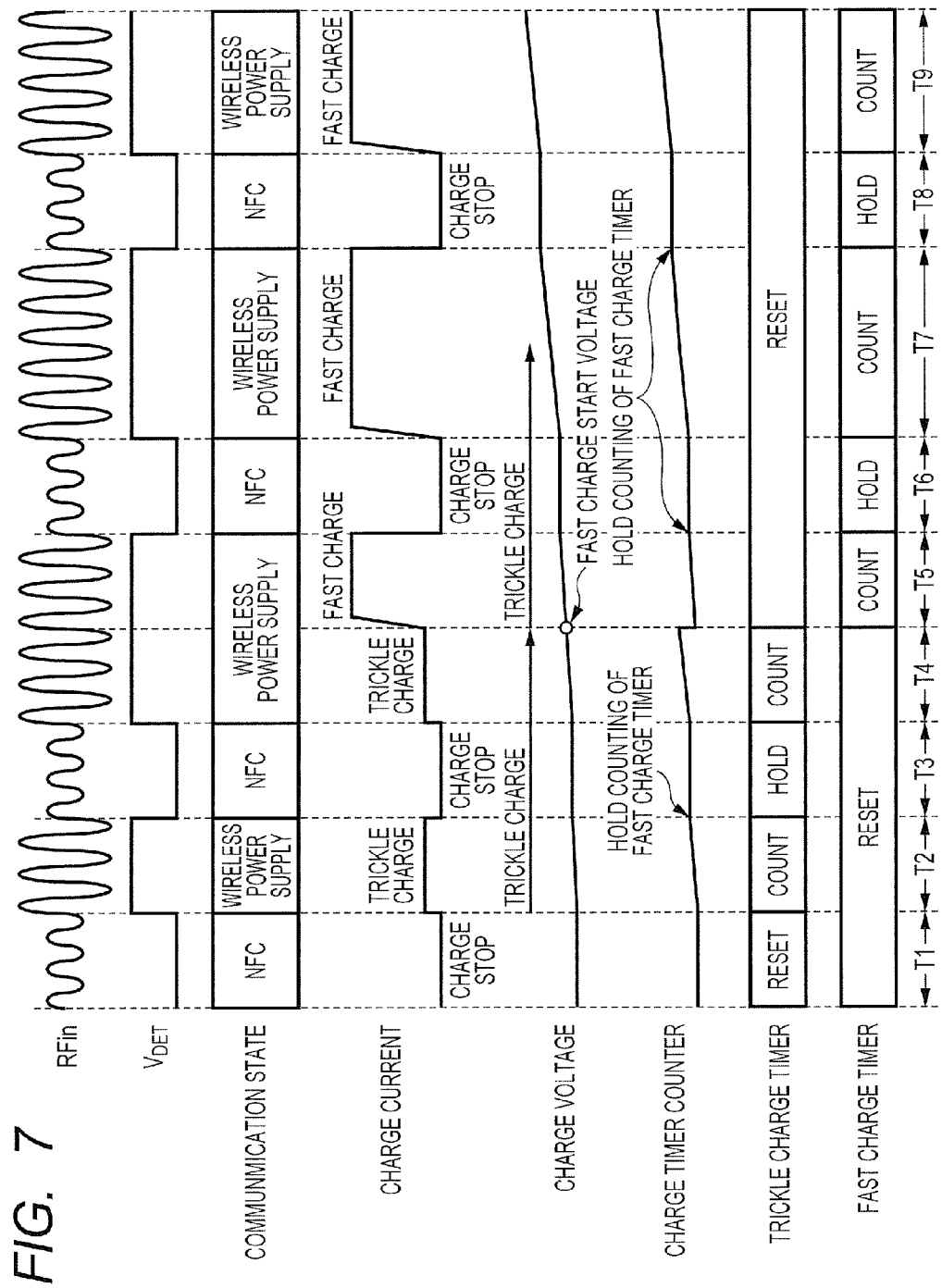
FIG. 7 is a time chart explaining the charge monitoring operation for the secondary cell using the charge timer of the semiconductor integrated circuit for battery charging control according to the first embodiment shown in FIGS. 4 and 5.
Figure 8:
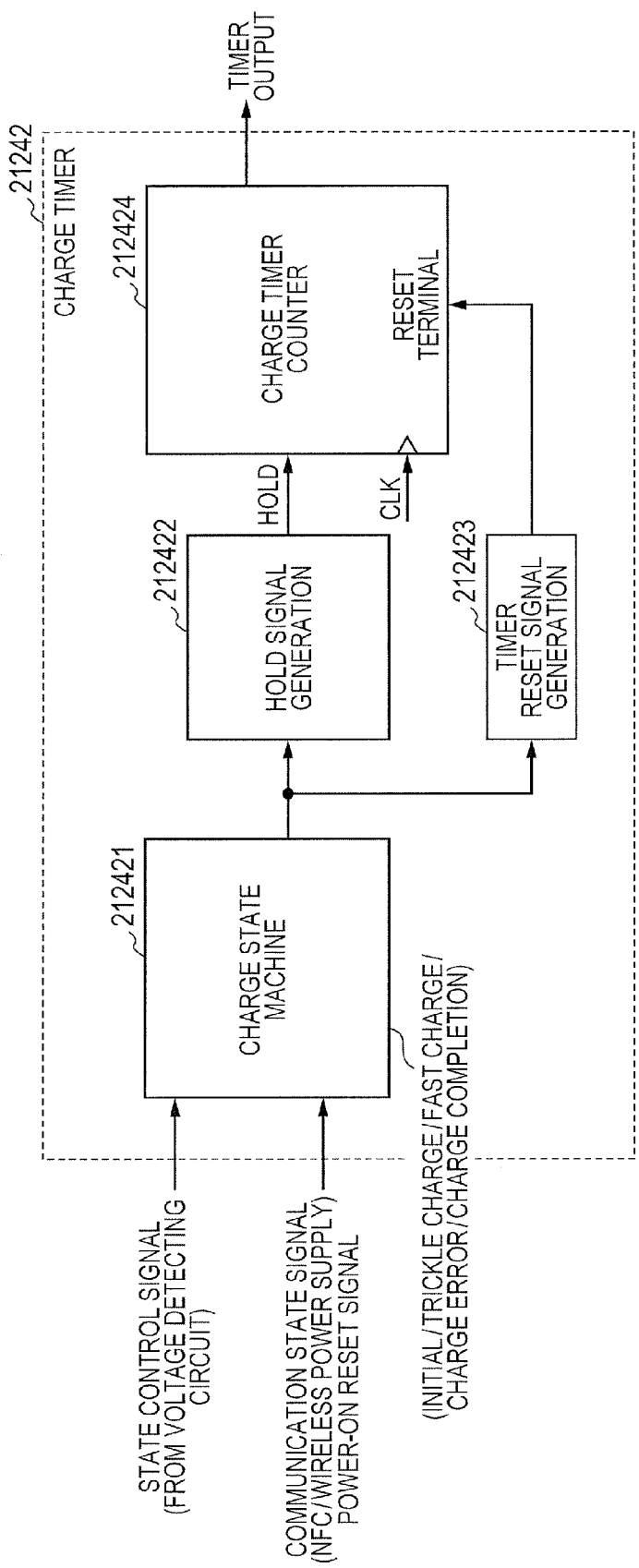
FIG. 8 is a diagram illustrating the configuration of a charge timer examined by the inventors of the present invention prior to the present invention.

FIG. 7 is a time chart explaining the charge monitoring operation for the secondary cell using the charge timer 21242 of the semiconductor integrated circuit 212 for battery charging control according to the first embodiment shown in FIGS. 4 and 5.

In FIG. 7, a waveform RFin of an RF signal received by the reception-side antenna coil 25 as one induction coil used for both NFC and charge is illustrated, and the voltage detection signal $V_{DET}$ generated by level detection of the voltage detecting circuit 21242 of a DC input voltage generated by rectifying and smoothing the RF signal RFin is also shown.

Further, in FIG. 7, a communication state including the NFC period and the power supply operation period of wireless power supply or the like repeated in a time division manner is illustrated. The period in which the voltage detection signal $V_{DET}$ is at the low level is determined as the NFC period, and the period in which the voltage detection signal $V_{DET}$ is at the high level is determined as the power supply operation period of wireless power supply or the like. As a result, as illustrated in FIG. 7, a first period T1, a third period T3, a sixth period T6, and an eighth period T8 in which the voltage detection signal $V_{DET}$ is at the low level are determined as the NFC periods, and a second period T2, a fourth period T4, a fifth period T5, a seventh period T7, and a ninth period T9 in which the voltage detection signal $V_{DET}$ is at the high level are determined as the power supply operation periods of wireless power supply or the like.

In FIG. 7, charge current and charge voltage for charging the secondary cell are illustrated. Before the charge voltage reaches the quick charge start voltage (Vquick) trickle charge is executed. After the charge voltage reaches the quick charge start voltage (Vquick), the quick charge is executed. As described above, the power of the NFC is not sufficient to charge the secondary cell (battery). Consequently, in the NFC periods of the first, third, sixth, and eighth periods T1, T3, T6, and T8, the charge current is zero ampere, and a charge stop state is obtained. Particularly, in the semiconductor integrated circuit 212 for battery charge control according to the first embodiment illustrated in FIGS. 4 and 5, also in the NFC periods of the third, sixth, and eighth periods T3, T6, and T8 of the second and subsequent times, the trickle charge timer or the quick charge timer is set to the hold state. As a result, the count value of the charge timer counter 212424 of the charge timer 21242 illustrated in FIG. 5 is held at the value at that time point without being reset to the count value (zero) of the initial value.

As described above, in the semiconductor integrated circuit 212 for battery charging control in the first embodiment illustrated in FIGS. 1 to 7, the problem such that in the case of repeating the NFC and the power supplying operation of wireless power supply or the like in a time division manner, the count value of the charge timer is reset to the initial value in the NFC period and the charge timer operates erroneously can be solved.

Although the invention achieved by the inventors of the present invention has been concretely described on the basis of the various embodiments above, obviously, the invention is not limited to the embodiments but can be variously changed without departing from the gist.

For example, an electronic device in which the semiconductor integrated circuit is mounted is not limited to a multi-functional cellular phone and a portable personal computer such as a tablet PC but can be applied to a digital video camera, a digital still camera, a portable music player, a portable DVD player, and the like.

What is claimed is:

1. A semiconductor integrated circuit comprising:
   an input terminal;
   a DC-DC converter;
   a charge output terminal;
   a voltage detecting circuit; and
   a charge timer,
   wherein a DC input voltage generated by rectifying and smoothing reception signals repetitively supplied as an RF signal by NFC and an RF signal by wireless power supply can be supplied to the input terminal,
   wherein the DC-DC converter can generate a DC output voltage having a desired voltage level from the DC input voltage supplied to the input terminal,
   wherein the charge output terminal can charge an external battery by using the DC output voltage generated by the DC-DC converter,
   wherein the voltage detecting circuit can detect that battery voltage of the charge output terminal reaches a predetermined voltage level by charging the battery and can generate a control signal in response to the battery voltage and the predetermined voltage level,
   wherein the charge timer can count charge time of the battery on the basis of control by the control signal generated from the voltage detecting circuit,
   wherein the voltage detecting circuit can generate a level determination signal discriminating a communication period of the NFC and a power supply period of the wireless power supply by detecting the level of the DC input voltage supplied to the input terminal, and
   wherein during execution of operation of counting the charge time of the battery by the charge timer, the voltage detecting circuit controls the charge timer by the control signal in the communication period of the NFC so that the charge timer holds a count value of the counting operation.

2. The semiconductor integrated circuit according to claim 1, further comprising a power supply output terminal,
wherein the power supply output terminal can supply the DC output voltage generated by the DC-DC converter to a power-reception-side system on the outside.

3. The semiconductor integrated circuit according to claim 2, further comprising a P-channel MOS transistor enabling electric conduction between the power supply output terminal and the charge output terminal.

4. The semiconductor integrated circuit according to claim 3,
wherein the predetermined voltage level includes a quick charge start voltage and a charge target voltage as a voltage higher than the quick charge start voltage,
wherein, before the battery voltage reaches the quick charge start voltage by the charging of the battery, a trickle charge that the battery is charged with low-level trickle charge current is executed, and
wherein, after the battery voltage reaches the quick charge start voltage by execution of the trickle charge on the battery, a quick charge of charging the battery with quick charge current having a level higher than that of the trickle charge current is executed.

5. The semiconductor integrated circuit according to claim 4,
wherein during operation of executing the trickle charge, the charge timer can count trickle charge time of the battery on the basis of the control executed by the control signal generated from the voltage detecting circuit, and
wherein during execution of operation of counting the trickle charge time of the battery by the charge timer, in the communication period of the NFC, the voltage detecting circuit controls the charge timer by the control signal, and the charge timer holds the count value of the counting operation.

6. The semiconductor integrated circuit according to claim 5,
wherein during operation of executing the quick charge, the charge timer can count quick charge time of the battery on the basis of the control executed by the control signal generated from the voltage detecting circuit, and
wherein during execution of operation of counting the quick charge time of the battery by the charge timer in the communication period of the NFC, the voltage detecting circuit controls the charge timer by the control signal, and the charge timer holds the count value of the counting operation.

7. The semiconductor integrated circuit according to claim 6,
wherein the charge timer includes a charge state machine, a hold signal generating unit, a charge timer counter, a trickle timer reset signal generating unit, a quick timer reset signal generating unit, a quick charge flag latch, and a selector,
wherein, to the charge state machine, the control signal generated from the voltage detecting circuit, a communication state signal discriminating the communication period of the NFC and the power supply period of the wireless power supply are supplied,
wherein in response to the control signal and the communication state signal, the charge state machine is set to any of an initial state, a trickle charge state, a quick charge state, a charge error state, a charge complete state, and a charge timer hold state,
wherein the initial state is a state before the battery is charged,
wherein the trickle charge state is a state in which the battery is charged by the trickle charge,
wherein the quick charge state is a state in which the battery is charged by the quick charge,
wherein the charge error state is for displaying a trickle charge error or a quick charge error,
wherein the trickle charge error is that the battery voltage of the battery does not reach the quick charge start voltage during a predetermined trickle charge period in spite of the trickle charge,
wherein the quick charge error is that the battery voltage of the battery does not reach the charge target voltage during a predetermined quick charge period in spite of the quick charge,
wherein the charge complete state is a state where the battery voltage reaches the quick charge start voltage during the predetermined trickle charge period by the trickle charge and, after that, the battery voltage reaches the charge target voltage during the predetermined quick charge period by the quick charge,
wherein the charge timer hold state is a state where the count value of the charge timer counter of the charge timer is held in the NFC period,
wherein in response to an output signal of the charge state machine which is set in any of the initial state, the charge error state, the charge complete state, and the charge timer hold state, the hold signal generating unit generates a hold signal and supplies it to a hold terminal of the charge timer counter,
wherein in response to the control signal generated from the voltage detecting circuit when the battery voltage reaches the quick charge start voltage during the predetermined trickle charge period by the trickle charge, the charge state machine supplies a first signal generation instruction to the trickle timer reset signal generation unit,
wherein in response to the first signal generation instruction supplied from the charge state machine, the trickle timer reset signal generating unit generates a trickle timer reset signal and supplies it to a first input terminal of the selector,
wherein in response to the control signal generated from the voltage detecting circuit at the time of start of the quick charge period when the battery voltage reaches the quick charge start voltage during the predetermined trickle charge period by the trickle charge, the charge state machine generates a quick charge flag signal,
wherein the quick charge flag signal is stored in the quick charge flag latch, and an output terminal of the quick charge flag latch is coupled to a selection control terminal of the selector,
wherein in response to the control signal generated from the voltage detecting circuit when the battery voltage reaches the charge target voltage during the predetermined quick charge period by the quick charge, the charge state machine supplies a second signal generation instruction to the quick timer reset signal generating unit,
wherein in response to the second signal generation instruction supplied from the charge state machine, the quick timer reset signal generating unit generates a quick timer reset signal and supplies it to a second input terminal of the selector,
wherein in response to the quick charge flag signal supplied from the output terminal of the quick charge flag latch to the selection control terminal, the selector selects the quick timer reset signal supplied to the second input terminal and supplies it to a reset terminal of the charge timer counter, wherein a clock signal having a predetermined frequency is supplied to a clock terminal of the charge timer counter, and wherein in the case where the hold signal is not supplied to the hold terminal but the trickle timer reset signal or the quick timer reset signal is not supplied from the selector to the reset terminal, the charge timer counter executes operation of counting up the count value of the counting operation in response to the clock signal.

8. The semiconductor integrated circuit according to claim 7, wherein the charge timer further includes an OR circuit, and wherein the quick timer reset signal selected by the selector is supplied to a first input terminal of the OR circuit, a power-on reset signal is supplied to a second input terminal of the OR circuit, and an output terminal of the OR circuit is coupled to the reset terminal of the charge timer counter.

9. The semiconductor integrated circuit according to claim 6, further comprising a linear regulator coupled in parallel to the DC-DC converter coupled between the input terminal and the power supply output terminal, wherein the linear regulator operates promptly in response to supply of the DC input voltage of the input terminal, and wherein the DC-DC converter operates as a switching regulator having power efficiency higher than that of the linear regulator.

10. The semiconductor integrated circuit according to claim 9, wherein the input terminal is configured so that, to the input terminal, the DC input voltage can be supplied via a first schottky diode and an AC-DC conversion voltage of an AC power supply coupling interface can be supplied via a second schottky diode.

11. The semiconductor integrated circuit according to claim 10, further comprising another input terminal and a switch, wherein the another input terminal is configured so that a USB power supply voltage of a USB coupling interface can be supplied to the another input terminal, and wherein one end and the other end of the switch are coupled to the another input terminal and the power supply output terminal, respectively.

12. An operation method of a semiconductor integrated circuit comprising an input terminal, a DC-DC converter, a charge output terminal, a voltage detecting circuit, and a charge timer, wherein a DC input voltage generated by rectifying and smoothing reception signals repetitively supplied as an RF signal by NFC and an RF signal by wireless power supply can be supplied to the input terminal, wherein the DC-DC converter can generate a DC output voltage having a desired voltage level from the DC input voltage supplied to the input terminal, wherein the charge output terminal can charge an external battery by using the DC output voltage generated by the DC-DC converter, wherein the voltage detecting circuit can detect that battery voltage of the charge output terminal reaches a predetermined voltage level by charging the battery and can generate a control signal in response to the battery voltage and the predetermined voltage level, wherein the charge timer can count charge time of the battery on the basis of control by the control signal generated from the voltage detecting circuit, wherein the voltage detecting circuit can generate a level determination signal discriminating a communication period of the NFC and a power supply period of the wireless power supply by detecting the level of the DC input voltage supplied to the input terminal, and wherein during execution of operation of counting the charge time of the battery by the charge timer, the voltage detecting circuit controls the charge timer by the control signal in the communication period of the NFC so that the charge timer holds a count value of the counting operation.

13. The operation method of a semiconductor integrated circuit according to claim 12, wherein the semiconductor integrated circuit further comprises a power supply output terminal, and wherein the power supply output terminal can supply the DC output voltage generated by the DC-DC converter to a power-reception-side system on the outside.

14. The operation method of a semiconductor integrated circuit according to claim 13, wherein the semiconductor integrated circuit further comprises a P-channel MOS transistor enabling electric conduction between the power supply output terminal and the charge output terminal.

15. The operation method of a semiconductor integrated circuit according to claim 14, wherein the predetermined voltage level includes a quick charge start voltage and a charge target voltage as a voltage higher than the quick charge start voltage, wherein, before the battery voltage reaches the quick charge start voltage by the charging of the battery, a trickle charge that the battery is charged with low-level trickle charge current is executed and, wherein, after the battery voltage reaches the quick charge start voltage by execution of the trickle charge on the battery, a quick charge of charging the battery with quick charge current having a level higher than that of the trickle charge current is executed.

16. The operation method of a semiconductor integrated circuit according to claim 15, wherein during operation of executing the trickle charge, the charge timer can count trickle charge time of the battery on the basis of the control executed by the control signal generated from the voltage detecting circuit, and wherein during execution of operation of counting the trickle charge time of the battery by the charge timer, in the communication period of the NFC, the voltage detecting circuit controls the charge timer by the control signal, and the charge timer holds the count value of the counting operation.

17. The operation method of a semiconductor integrated circuit according to claim 16, wherein during operation of executing the quick charge, the charge timer can count quick charge time of the battery on the basis of the control executed by the control signal generated from the voltage detecting circuit, and wherein during execution of operation of counting the quick charge time of the battery by the charge timer, in the communication period of the NFC, the voltage detecting circuit controls the charge timer by the control signal, and the charge timer holds the count value of the counting operation.

18. The operation method of a semiconductor integrated circuit according to claim 17, wherein the charge timer includes a charge state machine, a hold signal generating unit, a charge timer counter, a trickle timer reset signal generating unit, a quick timer reset signal generating unit, a quick charge flag latch, and a selector, wherein, to the charge state machine, the control signal generated from the voltage detecting circuit, and a communication state signal discriminating the communication period of the NFC and the power supply period of the wireless power supply are supplied, wherein in response to the control signal and the communication state signal, the charge state machine is set to any of an initial state, a trickle charge state, a quick charge state, a charge error state, a charge complete state, and a charge timer hold state, wherein the initial state is a state before the battery is charged, wherein the trickle charge state is a state in which the battery is charged by the trickle charge, wherein the quick charge state in which the battery is charged by the quick charge, wherein the charge error state is for displaying a trickle charge error or a quick charge error, wherein the trickle charge error is that the battery voltage of the battery does not reach the quick charge start voltage during a predetermined trickle charge period in spite of the trickle charge, wherein the quick charge error is that the battery voltage of the battery does not reach the charge target voltage during a predetermined quick charge period in spite of the quick charge, wherein the charge complete state is a state where the battery voltage reaches the quick charge start voltage during the predetermined trickle charge period by the trickle charge and, after that, the battery voltage reaches the charge target voltage during the predetermined quick charge period by the quick charge, wherein the charge timer hold state is a state where the count value of the charge timer counter of the charge timer is held in the NFC period, wherein in response to an output signal of the charge state machine which is set in any of the initial state, the charge error state, the charge complete state, and the charge timer hold state, the hold signal generating unit generates a hold signal and supplies it to a hold terminal of the charge timer counter, wherein in response to the control signal generated from the voltage detecting circuit when the battery voltage reaches the quick charge start voltage during the predetermined trickle charge period by the trickle charge, the charge state machine supplies a first signal generation instruction to the trickle timer reset signal generation unit, wherein in response to the first signal generation instruction supplied from the charge state machine, the trickle timer reset signal generating unit generates a trickle timer reset signal and supplies it to a first input terminal of the selector, wherein in response to the control signal generated from the voltage detecting circuit at the time of start of the quick charge period when the battery voltage reaches the quick charge start voltage during the predetermined trickle charge period by the trickle charge, the charge state machine generates a quick charge flag signal, wherein the quick charge flag signal is stored in the quick charge flag latch, and an output terminal of the quick charge flag latch is coupled to a selection control terminal of the selector, wherein in response to the control signal generated from the voltage detecting circuit when the battery voltage reaches the charge target voltage during the predetermined quick charge period by the quick charge, the charge state machine supplies a second signal generation instruction to the quick timer reset signal generating unit, wherein in response to the second signal generation instruction supplied from the charge state machine, the quick timer reset signal generating unit generates a quick timer reset signal and supplies it to a second input terminal of the selector, wherein in response to the quick charge flag signal supplied from the output terminal of the quick charge flag latch to the selection control terminal, the selector selects the quick timer reset signal supplied to the second input terminal and supplies it to a reset terminal of the charge timer counter, wherein a clock signal having a predetermined frequency is supplied to a clock terminal of the charge timer counter, and wherein in the case where the hold signal is not supplied to the hold terminal but the trickle timer reset signal or the quick timer reset signal is not supplied from the selector to the reset terminal, the charge timer counter executes operation of counting up the count value of the counting operation in response to the clock signal.

19. The operation method of a semiconductor integrated circuit according to claim 18,
wherein the charge timer further includes an OR circuit, and
wherein the quick timer reset signal selected by the selector is supplied to a first input terminal of the OR circuit, a power-on reset signal is supplied to a second input terminal of the OR circuit, and an output terminal of the OR circuit is coupled to the reset terminal of the charge timer counter.

20. The operation method of a semiconductor integrated circuit according to claim 17, further comprising a linear regulator coupled in parallel to the DC-DC converter coupled between the input terminal and the power supply output terminal,
wherein the linear regulator operates promptly in response to supply of the DC input voltage of the input terminal, and
wherein the DC-DC converter operates as a switching regulator having power efficiency higher than that of the linear regulator.

* * * * *